United States Patent
Liu et al.

(10) Patent No.: US 11,966,583 B2
(45) Date of Patent: *Apr. 23, 2024

(54) DATA PRE-PROCESSING METHOD AND DEVICE, AND RELATED COMPUTER DEVICE AND STORAGE MEDIUM

(71) Applicant: CAMBRICON TECHNOLOGIES CORPORATION LIMITED, Beijing (CN)

(72) Inventors: Shaoli Liu, Beijing (CN); Xiaofu Meng, Beijing (CN)

(73) Assignee: CAMBRICON TECHNOLOGIES CORPORATION LIMITED, Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/622,503

(22) PCT Filed: Jun. 27, 2019

(86) PCT No.: PCT/CN2019/093144
§ 371 (c)(1),
(2) Date: Dec. 13, 2019

(87) PCT Pub. No.: WO2020/042739
PCT Pub. Date: Mar. 5, 2020

(65) Prior Publication Data
US 2021/0334007 A1   Oct. 28, 2021

(30) Foreign Application Priority Data
Aug. 28, 2018  (CN) .......................... 201810987293.5
Aug. 28, 2018  (CN) .......................... 201810987343.X

(51) Int. Cl.
*G06F 12/00*   (2006.01)
*G06F 3/06*    (2006.01)
(Continued)

(52) U.S. Cl.
CPC .......... *G06F 3/0611* (2013.01); *G06F 3/0619* (2013.01); *G06F 3/0631* (2013.01);
(Continued)

(58) Field of Classification Search
CPC .... G06F 3/0611; G06F 3/0619; G06F 3/0631; G06F 3/0683
See application file for complete search history.

(56) References Cited

U.S. PATENT DOCUMENTS 5,052,043 A   9/1991   Gaborski
6,144,977 A   11/2000  Giangarra et al.
(Continued)

FOREIGN PATENT DOCUMENTS

CN   1503858 A   6/2004
CN   1503958 A   6/2004
(Continued)

OTHER PUBLICATIONS

Chen, T., et al., "DianNao: A Small-Footprint High-Throughput Accelerator for Ubiquitous Machine-Learning," ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.
(Continued)

*Primary Examiner* — David Yi
*Assistant Examiner* — Tahilba O Puche
(74) *Attorney, Agent, or Firm* — Rimon PC

(57) ABSTRACT

The present disclosure provides a data pre-processing method and device and related computer device and storage medium. By storing the target output data corresponding to the target operation into the first memory close to the processor and reducing the time of reading the target output data, the occupation time of I/O read operations during the
(Continued)

operation process can be reduced, and the speed and efficiency of the processor can be improved.

18 Claims, 7 Drawing Sheets

(51) Int. Cl.
    *G06F 13/16* (2006.01)
    *G06N 3/02* (2006.01)
(52) U.S. Cl.
    CPC ........ *G06F 3/0683* (2013.01); *G06F 13/1668* (2013.01); *G06N 3/02* (2013.01); *G06F 2213/16* (2013.01)

(56) References Cited

U.S. PATENT DOCUMENTS

| | | | |
|---|---|---|---|
| 6,671,796 B1 | 12/2003 | Sudharsanan et al. | |
| 6,715,065 B1 | 3/2004 | Ebata et al. | |
| 6,931,639 B1 | 8/2005 | Fickemeyer | |
| 7,236,995 B2 | 6/2007 | Hinds | |
| 7,242,414 B1 | 7/2007 | Thekkath et al. | |
| 7,406,451 B2 | 7/2008 | Mrziglod et al. | |
| 7,721,128 B2 | 5/2010 | Johns et al. | |
| 7,945,607 B2 | 5/2011 | Hinds | |
| 8,051,117 B2 | 11/2011 | Lundvall et al. | |
| 8,190,664 B2 | 5/2012 | Lundvall et al. | |
| 8,560,591 B2 | 10/2013 | Lundvall et al. | |
| 8,694,572 B2 | 4/2014 | Samy et al. | |
| 8,762,438 B2 | 6/2014 | Lundvall et al. | |
| 8,924,455 B1 | 12/2014 | Barman et al. | |
| 9,412,366 B2 | 8/2016 | Wilensky et al. | |
| 10,187,568 B1 | 1/2019 | Tran et al. | |
| 10,224,954 B1 | 3/2019 | Madduri et al. | |
| 10,360,304 B1 | 7/2019 | Alvarez et al. | |
| 10,409,560 B1* | 9/2019 | Bebee | G06F 8/4441 |
| 10,427,306 B1 | 10/2019 | Quinlan et al. | |
| 10,656,942 B2 | 5/2020 | Madduri et al. | |
| 10,929,744 B2 | 2/2021 | Li et al. | |
| 11,176,483 B1* | 11/2021 | Sundararaman | G06F 16/2282 |
| 2002/0138714 A1 | 9/2002 | Leibholz et al. | |
| 2003/0167460 A1 | 9/2003 | Desai et al. | |
| 2005/0138327 A1 | 6/2005 | Tabei | |
| 2006/0161375 A1 | 7/2006 | Duberstein et al. | |
| 2007/0220076 A1 | 9/2007 | Hinds | |
| 2007/0239632 A1* | 10/2007 | Burges | G06N 20/00 706/15 |
| 2008/0148120 A1 | 6/2008 | Seuring | |
| 2009/0113186 A1 | 4/2009 | Kato et al. | |
| 2009/0125293 A1 | 5/2009 | Lefurgy et al. | |
| 2010/0073068 A1 | 3/2010 | Cho et al. | |
| 2011/0060587 A1 | 3/2011 | Phillips et al. | |
| 2011/0301777 A1 | 12/2011 | Cox et al. | |
| 2012/0316845 A1 | 12/2012 | Grey et al. | |
| 2013/0054110 A1 | 2/2013 | Sata | |
| 2013/0332610 A1 | 12/2013 | Beveridge | |
| 2014/0081625 A1 | 3/2014 | Wilensky et al. | |
| 2014/0164737 A1 | 6/2014 | Collange et al. | |
| 2014/0249814 A1 | 9/2014 | Nakano et al. | |
| 2015/0134581 A1 | 5/2015 | Doeding et al. | |
| 2015/0370303 A1 | 12/2015 | Krishnaswamy et al. | |
| 2016/0026231 A1 | 1/2016 | Ignowski et al. | |
| 2016/0054922 A1 | 2/2016 | Awasthi et al. | |
| 2016/0124710 A1 | 5/2016 | Lutz et al. | |
| 2016/0170866 A1 | 6/2016 | Toualalen et al. | |
| 2016/0328645 A1 | 11/2016 | Lin et al. | |
| 2017/0061279 A1 | 3/2017 | Yang et al. | |
| 2017/0090956 A1 | 3/2017 | Linsky | |
| 2017/0103022 A1 | 4/2017 | Kreinin et al. | |
| 2017/0103316 A1* | 4/2017 | Ross | G06N 3/08 |
| 2017/0116520 A1* | 4/2017 | Min | G06N 3/08 |
| 2017/0142327 A1 | 5/2017 | Bayani | |
| 2017/0161604 A1* | 6/2017 | Craddock | G06N 3/063 |
| 2017/0221176 A1 | 8/2017 | Munteanu et al. | |
| 2017/0257079 A1 | 9/2017 | Jain et al. | |
| 2017/0262959 A1 | 9/2017 | Lee et al. | |
| 2017/0316307 A1 | 11/2017 | Koster et al. | |
| 2017/0316312 A1 | 11/2017 | Goyal et al. | |
| 2017/0344880 A1* | 11/2017 | Nekuii | G06F 17/153 |
| 2017/0344882 A1* | 11/2017 | Ambrose | G06N 3/045 |
| 2017/0353163 A1 | 12/2017 | Gazneli et al. | |
| 2017/0357530 A1 | 12/2017 | Shih et al. | |
| 2017/0357910 A1 | 12/2017 | Sommer et al. | |
| 2018/0046903 A1 | 2/2018 | Yao et al. | |
| 2018/0060719 A1* | 3/2018 | Kisilev | G06N 3/0454 |
| 2018/0088996 A1* | 3/2018 | Rossi | G06F 9/5016 |
| 2018/0096243 A1 | 4/2018 | Patil et al. | |
| 2018/0121796 A1* | 5/2018 | Deisher | G10L 15/16 |
| 2018/0157464 A1 | 6/2018 | Lutz et al. | |
| 2018/0157971 A1* | 6/2018 | Fusi | G06F 17/16 |
| 2018/0260710 A1 | 9/2018 | Zhang et al. | |
| 2018/0288440 A1 | 10/2018 | Chao | |
| 2018/0293517 A1 | 10/2018 | Browne et al. | |
| 2018/0300616 A1* | 10/2018 | Ambardekar | G06F 1/3287 |
| 2018/0300931 A1 | 10/2018 | Vembu et al. | |
| 2018/0314945 A1* | 11/2018 | Breternitz | G06N 3/04 |
| 2018/0322391 A1 | 11/2018 | Wu et al. | |
| 2018/0329512 A1* | 11/2018 | Liao | G06F 3/167 |
| 2018/0336461 A1* | 11/2018 | Seide | G06F 9/46 |
| 2018/0357541 A1* | 12/2018 | Chen | G06F 9/5016 |
| 2018/0367729 A1 | 12/2018 | Parasnis et al. | |
| 2018/0373976 A1* | 12/2018 | Woo | G06N 3/0427 |
| 2019/0034784 A1 | 1/2019 | Li et al. | |
| 2019/0042925 A1* | 2/2019 | Choe | G06N 3/063 |
| 2019/0050710 A1 | 2/2019 | Wang et al. | |
| 2019/0057696 A1 | 2/2019 | Ogawa | |
| 2019/0114142 A1 | 4/2019 | Yoda et al. | |
| 2019/0122094 A1 | 4/2019 | Chen et al. | |
| 2019/0122119 A1 | 4/2019 | Husain | |
| 2019/0138372 A1 | 5/2019 | Tee | |
| 2019/0156188 A1* | 5/2019 | Ono | G06N 3/0454 |
| 2019/0164285 A1 | 5/2019 | Nye et al. | |
| 2019/0180170 A1* | 6/2019 | Huang | G06F 13/28 |
| 2019/0199370 A1 | 6/2019 | Madduri et al. | |
| 2019/0205737 A1 | 7/2019 | Bleiweiss et al. | |
| 2019/0205746 A1 | 7/2019 | Nurvitadhi et al. | |
| 2019/0220734 A1* | 7/2019 | Ferdman | G06F 17/15 |
| 2019/0228762 A1 | 7/2019 | Wang et al. | |
| 2019/0243755 A1* | 8/2019 | Luo | G06N 3/04 |
| 2019/0251429 A1 | 8/2019 | Du et al. | |
| 2019/0265949 A1 | 8/2019 | Ito | |
| 2019/0278677 A1 | 9/2019 | Terechko et al. | |
| 2019/0294968 A1* | 9/2019 | Vantrease | G06N 3/08 |
| 2019/0339937 A1 | 11/2019 | Lo et al. | |
| 2020/0005424 A1 | 1/2020 | Appu et al. | |
| 2020/0097799 A1 | 3/2020 | Divakar et al. | |
| 2020/0117453 A1 | 4/2020 | Zhang et al. | |
| 2020/0117614 A1 | 4/2020 | Zhang et al. | |
| 2020/0125508 A1 | 4/2020 | Liu et al. | |
| 2020/0126554 A1 | 4/2020 | Chen et al. | |
| 2020/0126555 A1 | 4/2020 | Chen et al. | |
| 2020/0142748 A1 | 5/2020 | Liu et al. | |
| 2020/0159527 A1 | 5/2020 | Zhang et al. | |
| 2020/0159530 A1 | 5/2020 | Zhang et al. | |
| 2020/0159531 A1 | 5/2020 | Zhang et al. | |
| 2020/0159532 A1 | 5/2020 | Zhang et al. | |
| 2020/0159533 A1 | 5/2020 | Zhang et al. | |
| 2020/0159534 A1 | 5/2020 | Li et al. | |
| 2020/0160162 A1 | 5/2020 | Zhang et al. | |
| 2020/0160163 A1 | 5/2020 | Liu et al. | |
| 2020/0160219 A1 | 5/2020 | Zhang et al. | |
| 2020/0160220 A1 | 5/2020 | Zhang et al. | |
| 2020/0160221 A1 | 5/2020 | Zhang et al. | |
| 2020/0160222 A1 | 5/2020 | Zhang et al. | |
| 2020/0168227 A1 | 5/2020 | Chen et al. | |
| 2020/0174547 A1 | 6/2020 | Fang et al. | |
| 2020/0183752 A1 | 6/2020 | Liu et al. | |
| 2020/0241874 A1 | 7/2020 | Chen et al. | |
| 2020/0257972 A1* | 8/2020 | Miniskar | G06F 12/02 |
| 2020/0334041 A1 | 10/2020 | Zhang et al. | |
| 2020/0334522 A1 | 10/2020 | Zhang et al. | |
| 2020/0334572 A1 | 10/2020 | Zhang et al. | |
| 2020/0394522 A1 | 12/2020 | Liu et al. | |

(56) References Cited

U.S. PATENT DOCUMENTS

| | | |
|---|---|---|
| 2020/0394523 A1 | 12/2020 | Liu et al. |
| 2021/0042889 A1 | 2/2021 | Pei |
| 2021/0061028 A1 | 3/2021 | Da Deppo et al. |
| 2021/0117768 A1 | 4/2021 | Liu et al. |
| 2021/0117810 A1 | 4/2021 | Liu |
| 2021/0182177 A1 | 6/2021 | Su et al. |
| 2021/0264270 A1 | 8/2021 | Liu et al. |
| 2021/0334007 A1 | 10/2021 | Liu et al. |
| 2021/0334137 A1 | 10/2021 | Zhang et al. |
| 2021/0341989 A1 | 11/2021 | Chen et al. |
| 2021/0374510 A1 | 12/2021 | Liu et al. |
| 2021/0374511 A1 | 12/2021 | Liu et al. |

FOREIGN PATENT DOCUMENTS

| | | |
|---|---|---|
| CN | 1851668 A | 10/2006 |
| CN | 101572829 A | 11/2009 |
| CN | 102270042 A | 12/2011 |
| CN | 102404673 A | 4/2012 |
| CN | 102684701 A | 9/2012 |
| CN | 102761509 A | 10/2012 |
| CN | 102789413 A | 11/2012 |
| CN | 102903089 A | 1/2013 |
| CN | 102981854 A | 3/2013 |
| CN | 103152673 A | 6/2013 |
| CN | 104914977 A | 9/2015 |
| CN | 105389158 A | 3/2016 |
| CN | 103534664 A | 8/2016 |
| CN | 105893419 A | 8/2016 |
| CN | 105978611 A | 9/2016 |
| CN | 106156310 A | 11/2016 |
| CN | 106354568 A | 1/2017 |
| CN | 106406812 A | 2/2017 |
| CN | 106469291 A | 3/2017 |
| CN | 106485316 A | 3/2017 |
| CN | 106502626 A | 3/2017 |
| CN | 106570559 A | 4/2017 |
| CN | 106650922 A | 5/2017 |
| CN | 106814639 A | 6/2017 |
| CN | 106874219 A | 6/2017 |
| CN | 106951587 A | 7/2017 |
| CN | 106951962 A | 7/2017 |
| CN | 106951962 A1 | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107451658 A | 12/2017 |
| CN | 107608715 A | 1/2018 |
| CN | 107609642 A | 1/2018 |
| CN | 107644254 A | 1/2018 |
| CN | 107688855 A | 2/2018 |
| CN | 107797913 A | 3/2018 |
| CN | 108053028 A | 5/2018 |
| CN | 104899641 A | 7/2018 |
| CN | 108337000 A | 7/2018 |
| CN | 108510067 A | 9/2018 |
| CN | 108717570 A | 10/2018 |
| CN | 109062540 A | 12/2018 |
| CN | 109063820 A | 12/2018 |
| CN | 109902745 A | 6/2019 |
| CN | 109934331 A | 6/2019 |
| CN | 109993296 A | 7/2019 |
| CN | 110059733 A | 7/2019 |
| CN | 11055450 A | 12/2019 |
| CN | 110780845 A | 2/2020 |
| EP | 0 789 296 A1 | 8/1997 |
| EP | 2 703 945 A2 | 3/2014 |
| EP | 3 106 997 A2 | 12/2016 |
| EP | 3 407 268 A1 | 11/2018 |
| EP | 3407268 A1 | 8/2019 |
| JP | H03-075860 A | 8/1989 |
| JP | H09-265379 A | 10/1997 |
| JP | 2009-134433 A | 8/2012 |
| JP | 2013-514570 A | 4/2013 |
| JP | 2014-199464 A | 10/2014 |
| JP | 2013514570 A | 4/2015 |
| JP | 2015-176158 A | 10/2015 |
| JP | 201826114 A | 2/2018 |
| JP | 2019-519852 A | 7/2019 |
| WO | 2008153194 A1 | 12/2008 |
| WO | 2014199464 A1 | 12/2014 |
| WO | 2016186823 A1 | 11/2016 |
| WO | 2017138220 A1 | 8/2017 |
| WO | 2017185412 A1 | 11/2017 |
| WO | 20180103736 A1 | 4/2018 |
| WO | 20180113239 A1 | 4/2018 |

OTHER PUBLICATIONS

Chen, T., et al., "A Small-Footprint Accelerator for Large-Scale Neural Networks," ACM Transactions on Computer Systems (TOCS), vol. 33, Issue 2, May 1, 2015, Article No. 6, ACM New York, NY, USA; available: https://dl.acm.org/citation.cfm?id=2701417.

Chen, Y., et al., "DaDianNao: A Machine-Learning Supercomputer," MICRO-47 Proceedings of the 47th Annual IEEE/ACM International Symposium on Microarchitecture, pp. 609-622, Cambridge, United Kingdom—Dec. 13, 2014; available: https://dl.acm.org/citation.cfm?id=2742217.

Luo, T., et al., "DaDianNao: A Neural Network Supercomputer," Published in: IEEE Transactions on Computers, vol. 66, Issue: 1, pp. 73-88, Date of Publication: May 30, 2016; available: https://ieeexplore.ieee.org/document/7480791.

Liu, D., et al., "PuDianNao: A Polyvalent Machine Learning Accelerator," ASPLOS '15 Proceedings of the Twentieth International Conference on Architectural Support for Programming Languages and Operating Systems, pp. 369-381, Istanbul, Turkey—Mar. 14, 2015; available: https://dl.acm.org/citation.cfm?id=2694358.

Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015; available: https://dl.acm.org/citation.cfm?id=2750389.

Du, Z., et al., "An Accelerator for High Efficient Vision Processing," Published in: IEEE Transactions on Computer-Aided Design of Integrated Circuits and Systems, vol. 36, Issue: 2, Jun. 22, 2016, pp. 227-240; available: https://ieeexplore.ieee.org/document/7497562.

Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; available: https://ieeexplore.ieee.org/document/7551409.

Zhang, S. et al., "Cambricon-X: An Accelerator for Sparse Neural Networks," Published in: 2016 49th Annual IEEE/ ACM International Symposium on Microarchitecture (MICRO), Taipei, Taiwan, Oct. 15, 2016; available: https://ieeexplore.ieee.org/document/7783723.

Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.

Vivienne Sze et al., "Efficient Processing of Deep Neural Networks: A Tutorial and Survey", arxiv.org, Cornell University Library, 201 Olin Library Cornell University Ithaca, NY 14853, Mar. 27, 2017 (Mar. 27, 2017), XP080759895, DOI: 10.1109/JPROC.2017.2761740.

Liu Shaoli et al., "Cambricon: An Instruction Set Architecture for Neural Networks", 2013 21st International Conference on Program Comprehension (ICPC); [International Symposium on Computer Architecture.(ISCA)], IEEE, US, Jun. 18, 2016 (Jun. 18, 2016), pp. 393-405, XP032950675, ISSN: 1063-6897, DOI: 10.1109/ISCA.2016.42 ISBN: 978-0-7695-3174-8 [retrieved on Aug. 24, 2016].

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://

(56) References Cited

OTHER PUBLICATIONS math-atlas.sourceforge.net/devel/assembly/ vector_simd_pem. ppc. 2005AUG23.pdf [retrieved on Mar. 3, 2020].
Sumod Mohan, "Accuracy and Multi-Core Performance of Machine Learning Algorithms for Handwritten Character Recognition", Aug. 1, 2009 (Aug. 1, 2009), XP055673941, Retrieved from the Internet: URL:https://tigerprints.clemson.edu/cgi/viewcontent.cgi? article=1634&context=all theses retrieved on Mar. 5, 2020].
European Patent Office, Extended European Search Report for European Application No. 19212749.6 dated Mar. 18, 2020.
European Patent Office, Extended European Search Report for European Application No. 19212750.4 dated Mar. 18, 2020.
European Patent Office, Extended European Search Report for European Application No. 19212751.2 dated Mar. 18, 2020.
European Patent Office, Extended European Search Report for European Application No. 19212752.0 dated Mar. 18, 2020.
European Patent Office, Extended European Search Report for European Application No. 19214004.4 dated Mar. 18, 2020.
European Patent Office, Extended European Search Report for European Application No. 19213389.0 dated Mar. 18, 2020.
European Patent Office, Extended European Search Report for European Application No. 19212753.8 dated Mar. 18, 2020.
European Patent Office, Extended European Search Report for European Application No. 19212754.6 dated Mar. 18, 2020.
European Patent Office, Extended European Search Report for European Application No. 19212755.3 dated Mar. 18, 2020.
European Patent Office, Extended European Search Report for European Application No. 19212756.1 dated Mar. 18, 2020.
European Patent Office, Extended European Search Report for European Application No. 18906652.6 dated Mar. 18, 2020.
European Patent Office, Extended European Search Report for European Application No. 19212746.2 dated Mar. 18, 2020.
Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.
Li et al., "Using Artificial Neural Network for Predicting Thread Partitioning in Speculative Multithreading", IEEE, 2015, pp. 823-826.
Na et al., "Speeding up Convolutional Neural Network Training with Dynamic Precision Scaling and Flexible MultiplierAccumulator", Section 2 Proposed Approach: Concept, ACM, Aug. 8-10, 2016, 6 pages.
Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.
Anonymous, "Control unit—Wikipedia", May 8, 2017 (May 8, 2017), XP055673879, Retrieved from the Internet: URL: https://web.archive.org/web/20170508110348/https://en.wikipedia.org/ wiki/Control unit [retrieved on Mar. 5, 2020].
Joel Emer et al., "DNN Accelerator Architectures", CICS/MTL Tutorial, Jan. 1, 2017 (Jan. 1, 2017), XP055672691, Retrieved from the Internet: URL:https://www.rle.mit.edu/eems/wp-content/uploads/ 2017/031Tutorial-on- JNN-4-of-5-DNN-Accelerator-Architectures. pdf [retrieved on Mar. 2, 2020].
Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].
Pedro O. Domingos, et al., "An Efficient and Scalable Architecture for Neural Networks With Backpropagation Learning" Proceedings/ 2005 International Conference on Field Programmable Logic and Applications {FPL): Tampere Hall, Tampere, Finland, Jan. 1, 2005, pp. 89-94, XP055606447, Piscataway, NJ. DOI: 10.1109/FPL.2005. 1515704 ISBN: 978-0-7803-9362-2.
Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/ MSPEC.2016.7524158 [retrieved on Jul. 27, 2016].
Song Mingcong et al., "In-Situ AI: Towards Autonomous and Incremental Deep Learning for IoT Systems", 2018 IEEE International Symposium on High Performance Computer Architecture (HPCA), IEEE, Feb. 24, 2018 (Feb. 24, 2018), pp. 92-103, XP033341941, DOI: 10.1109/HPCA.2018.00018 [retrieved on Mar. 27, 2018].
Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE. 2018.844167 4 [retrieved on Aug. 20, 2018].
Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].
European Patent Office, extended European search report for Application No. 19216754.2 dated May 8, 2020.
Extended European Search Report for EP Application No. 19214324.6 dated Oct. 1, 2020.
International Searching Authority, International Search Report for PCT Application No. PCT/CN2019/093144 dated Oct. 9, 2019.
Extended European Search Report for Application No. 19215861.6 dated May 15, 2020.
Extended European Search Report for Application No. 19215862.4 dated May 15, 2020.
Sumina Yamashita, et al., "A Method to create illustrate images using DCGAN," JISJ SIG Technical Report, vol. 2017-MPS-112 No. 16, Feb. 27, 2017; translation of abstract included.
A Framework for Algorithm Deployment on Cloud-based Quantum Computers; arxiv.org, Cornell University Library, 201 Olin Library Cornell University Ithaca, NY 14853, Dated Oct. 24, 2018; pp. 1-10.
Rakanovic Damjan Et Al: "Reducing off-chip memory traffic in deep CNNs using stick buffer cache" XP033293504.

* cited by examiner

DATA PRE-PROCESSING METHOD AND DEVICE, AND RELATED COMPUTER DEVICE AND STORAGE MEDIUM

RELATED APPLICATIONS

This application is a national stage application of PCT/CN2019/093144, filed Jun. 27, 2019, which claims the benefit of priority from Chinese Application No. 201810987343.X, filed Aug. 28, 2018, and Chinese Application No. 201810987293.5, filed Aug. 28, 2018, the disclosures of which are incorporated herein by reference in their entirety.

RELEVANT APPLICATIONS

The present disclosure claims the benefit and priority of Chinese Patent Application No. 2018109872935 with the title of "Pre-processing Method and Device of Data, Computer Device and Storage Medium" filed on Aug. 28, 2018, the content of which is incorporated herein by reference in its entirety.

The present disclosure claims the benefit and priority of Chinese Patent Application No. 201810987343X with the title of "Pre-processing Method and Device of Data, Computer Device and Storage Medium" filed on Aug. 28, 2018, the content of which is incorporated herein by reference in its entirety.

TECHNICAL FIELD

The disclosure relates to the field of computer technology, and specifically relates to a data pre-processing method and device, computer device and storage medium.

BACKGROUND

With the explosive growth of data volume, artificial intelligence algorithms such as machine learning have been applied widely. Machine learning requires analyzing a large amount of data. Therefore, the demand for memory access for big data operations such as machine learning has increased sharply.

In order to meet the memory access requirement and the like, a multi-level memory architecture, i.e., an architecture using a cache, a primary memory, and an external memory, is currently used. Among them, the access speed of the cache, the primary memory, and the external memory is sequentially decreased, while the storage capacity is sequentially increased. However, since the bandwidth of the I/O in the computer device often fails to meet the requirement of large amounts of data, during the process of machine learning, data reading need to be performed frequently between the cache and the primary memory, and/or the primary memory and the external memory. For example, operation, the processor first needs to read the input data from the external memory. After the operation is completed, the processor needs to write the operation result into the external memory, and then reads the input data required for the next operation from the external memory. Due to limited I/O bandwidth, at least two I/O read and write operations are involved during one operation, and frequent I/O read and write operations take a long time, resulting in low processing efficiency.

SUMMARY

In order to solve the above technical problems, the present disclosure provides a data pre-processing method and device, related computer device and storage medium, which can reduce the time of I/O read and write operations during the operation process and improve the efficiency of a processor.

A data pre-processing method, which may include the following steps:
- obtaining an available storage capacity of a first memory and a target operation;
- determining target input data corresponding to the target operation according to the target operation and the available storage capacity of the first memory, where the target input data may be part or all of input data corresponding to the target operation;
- determining, according to the target operation and the target input data, the target output data of the target operation;
- storing, if the target output data of the target operation is the input data of other operation after the target operation, the target output data of the target operation into the first memory, where the first memory is close to a processor.

A pre-processing device of data, which may include:
- an obtaining module configured to obtain the available storage capacity of the first memory and the target operation;
- an input determination module configured to determine the target input data corresponding to the target operation according to the target operation and the available storage capacity of the first memory;
- an output determination module configured to determine the target output data corresponding to the target operation according to the target operation and the target input data; and
- a storage allocation module configured to store the target output data of the target operation into the first memory when the target output data of the target operation is the input data of other operation after the target operation, where the first memory may be close to the processor.

A computer device may include a first memory, a second memory, and a processor. The first memory may be close to the processor; the first memory and the second memory may be capable of reading and writing data; the second memory may store a computer program, where the steps of the method provided by the present disclosure may be implemented when the processor executes the computer program.

A computer readable storage medium may store the computer program, and the steps of the method provided by the present disclosure may be implemented when the computer program is executed by the processor.

The data pre-processing method and device, the computer device, and the storage medium may store the target output data corresponding to the target operation into the first memory closed to the processor when the target output data of the target operation is the input data of other operation after the target operation. By reducing the time of reading the target output data, the occupation time of the I/O read operation during the operation process may be reduced, so that the speed and efficiency of the processor may be improved.

A data pre-processing method, which may include the following steps:
- obtaining the available storage capacity of a primary memory, the available storage capacity of a secondary memory, and the target operation;
- determining the target input data corresponding to the target operation according to the available storage capacity of the primary memory, the available storage capacity of the secondary memory, and the target operation;

determining the target output data corresponding to the target operation according to the target operation and the target input data; and storing, if the target output data of the target operation is the input data of other operation after the target operation, the target output data of the target operation into the primary memory.

In an embodiment, the step of determining the target input data corresponding to the target operation according to the available storage capacity of the primary memory, the available storage capacity of the secondary memory, and the target operation may include:

comparing the available storage capacity of the primary memory with the available storage capacity of each secondary memory, and taking the smallest available storage capacity as the available storage capacity of the first memory; and determining the target input data corresponding to the target operation according to the available storage capacity of the first memory and the target operation.

In an embodiment, the target operation may include one or more operations, and each operation may correspond to the sub-target input data; and the step of determining the target input data corresponding to the target operation according to the available storage capacity of the first memory and the target operation may include:

determining a count of operations that can be fused and obtaining a threshold of a count of fusion according to the available storage capacity of the first memory and the fusion attribute of each operation to be processed;

taking a certain count of combinations of the operations that can be fused as target operations, where the certain count may be less than or equal to the threshold of the count of fusion; and taking sub-target input data corresponding to a certain count of operations that can be fused as the target input data corresponding to the target operation.

In an embodiment, the operation to be processed is a neural network operation containing a plurality of operation layers, where each operation layer may represent an operation; and the method may further include the following step:

determining the fusion attribute of each operation according to a connection relationship of each operation layer of the neural network operation.

In an embodiment, the input data corresponding to the target operation may include a plurality of input data blocks, each target input data may include one or more of the input data blocks, and the count of the target input data corresponding to the target operation is one or more.

In an embodiment, the target operation may include one or more sub-target operations, and each sub-target operation may correspond to one of the target input data; and the method may further include the following steps:

determining, according to a data volume of the target input data and a data volume of the target output data of each sub-target operation, a target storage capacity required for each sub-target operation;

determining a remaining storage capacity of the first memory according to the available storage capacity of the first memory and the target storage capacity required for the current sub-target operation; and determining the count of the sub-target operations according to the remaining storage capacity of the first memory and the target storage capacity required for other sub-target operations other than the current sub-target operation.

In an embodiment, the target input data may include first target input data and second target input data; and the method may further include the following step:

determining, according to a preset operation allocation rule, the first target input data corresponding to the primary memory and the second target input data corresponding to each secondary memory.

In an embodiment, the method may further include the following steps:

determining, according to the available storage capacity of the primary memory and the data volume of the first target input data, a storage address of the first target input data in the primary memory; and determining, according to the available storage capacity of each secondary memory and the corresponding data volume of the second target input data respectively, a storage address of each second target input data in the secondary memory.

In an embodiment, the target output data may include first target output data and second target output data; and the step of determining the target output data corresponding to the target operation according to the target operation and the target input data may include:

determining, according to the target operation and the first target input data, the first target output data and a storage address of the first target output data in the primary memory;

determining, according to the target operation and each second target input data, each second target output data and a storage address of each second target output data in the corresponding secondary memory;

determining, according to each second target output data, a storage address of each second target output data in the primary memory.

In an embodiment, the method may further include the following step:

storing the second target output data into the secondary memory corresponding to a secondary processing circuit, if other target operations performed on the secondary processing circuit need to use the second target output data.

In an embodiment, the method may further include the following step:

storing, when the target output data of the target operation is the input data of other operation after the target operation, the target output data into the primary memory and the second memory correspondingly.

A pre-processing device of data may include:

an obtaining module configured to obtain the available storage capacity of the primary memory, the available storage capacity of the secondary memory, and the target operation;

an input determination module configured to determine the target input data corresponding to the target operation according to the available storage capacity of the primary memory, the available storage capacity of the secondary memory, and the target operation;

an output determination module configured to determine the target output data corresponding to the target operation according to the target operation and the target input data;

a storage allocation module configured to store the target output data into the primary memory when the target output data of the target operation is the input data of other operation after the target operation.

In an embodiment, the pre-processing device of data may further include a storage capacity determination module configured to compare the available storage capacity of the primary memory with the available storage capacity of each secondary memory, and take the smallest available storage capacity as the available storage capacity of the first memory.

The input determination module may be specifically configured to determine the target input data corresponding to the target operation according to the available storage capacity of the first memory and the target operation.

In an embodiment, the target operation may include one or more operations, and each operation may correspond to the sub-target input data; and the input determination module may include:
- a fusion determination unit configured to determine the count of operations that can be fused and obtain the threshold of the count of fusion according to the available storage capacity of the first memory and the fusion attribute of each operation to be processed;
- an input determination unit configured to take a certain count of combinations of the operations that can be fused as the target operations, where the certain count may be less than or equal to the threshold of the count of fusion; and take the sub-target input data corresponding to a certain count of operations as the target input data corresponding to the target operation.

In an embodiment, the operation to be processed is a neural network operation including a plurality of operation layers, where each operation layer may represent an operation; and the fusion determination unit may be further configured to determine the fusion attribute of each operation according to the connection relationship of each operation layer of the neural network operation.

In an embodiment, the target operation may include one or more sub-target operations, and each sub-target operation may correspond to one of the target input data, where all input data corresponding to the target operation may include a plurality of input data blocks, each target input data may include one or more of the input data blocks, and the count of the target input data corresponding to the target operation is one or more. The input determination module may be further configured to:
- determine the target storage capacity required for each sub-target operation according to the data volume of the target input data and the data volume of the target output data of each sub-target operation;
- determine the remaining storage capacity of the first memory according to the available storage capacity of the first memory and the target storage capacity required for the current sub-target operation;
- determine the count of the sub-target operations according to the remaining storage capacity of the first memory and the target storage capacity required for other sub-target operations other than the current sub-target operation.

In an embodiment, the target input data may include the first target input data and the second target input data.

The input determination module may be further configured to determine the first target input data corresponding to the primary memory and the second target input data corresponding to each secondary memory according to a preset operation allocation rule.

The storage allocation module may be further configured to determine a storage address of the first target input data in the primary memory according to the available storage capacity of the primary memory and the data volume of the first target input data; and determine the storage address of each second target input data in the secondary memory according to the available storage capacity of each secondary memory and the corresponding data volume of the second target input data respectively.

In an embodiment, the target output data may include the first target output data and the second target output data; and the output determination module may be further configured to:
- determine the first target output data and the storage address of the first target output data in the primary memory according to the target operation and the first target input data;
- determine each second target output data and the storage address of each second target output data in the corresponding secondary memory according to the target operation and each second target input data; and
- determine the storage address of each second target output data in the primary memory according to each second target output data.

In an embodiment, the storage allocation module may be further configured to store the second target output data into the secondary memory corresponding to the secondary processing circuit when other target operations performed on the secondary processing circuit need to use the second target output data.

A computer device may include:
- a processor including a controller unit and an operation unit, where the controller unit is connected to the operation unit, and the operation unit may include a primary processing circuit and a plurality of secondary processing circuits;
- a plurality of first memories including a primary memory and a plurality of secondary memories, where the primary memory may be disposed close to the primary processor, the plurality of secondary memories may be disposed corresponding to the plurality of secondary processing circuits, and each of the secondary processor is respectively disposed close to the corresponding secondary processing circuit; and
- a second memory, where the first memory and the second memory may read and write data, the first memory or the second memory may store a computer program, and the steps of the method provided by the present disclosure may be implemented when the processor executes the computer program.

A computer readable storage medium may store the computer program, and the steps of the method provided by the present disclosure may be implemented when the computer program is executed by the processor.

The data pre-processing method and device, the related computer device and the storage medium may store the target output data corresponding to the target operation into the primary memory when the target output data of the target operation is the input data of other operation after the target operation. By reducing data interaction between the primary memory and the secondary memory and reducing the time of reading the target output data, the occupation time of the I/O read operation during the operation process may be reduced, so that the speed and efficiency of the processor may be improved. Further, the data pre-processing method can also reduce data interaction between the primary memory and the secondary memory, further reduce the occupation time of the I/O read operation during the operation process, and improve the speed and efficiency of the processor.

BRIEF DESCRIPTION OF THE DRAWINGS

The attached drawings herein are incorporated into the specification and form part of this specification, showing the embodiments consistent with this disclosure, and explaining the principles of this disclosure together with the specification.

DETAILED DESCRIPTION OF THE EMBODIMENTS

In order to make the purpose, technical solutions and advantages of the disclosure clearer, the disclosure will further be described below in combination with specific examples and with reference to the drawings in detail. It should be understood that the embodiments described herein are used only to interpret but not to limit this disclosure.

It should be understood that the terms such as "first", "second", "third", "fourth" and the like used in the specification, the claims, and the accompanied drawings of the present disclosure are used for distinguishing between different objects rather than describing a particular order. The terms "include" and "comprise" used in the specification and claims are intended to indicate existence of the described features, whole body, steps, operations, elements, and/or components, but do not exclude the existence or addition of one or more other features, whole body, steps, operations, elements, components, and/or collections thereof.

It should also be understood that the terms used in the specification of the present disclosure are merely intended to describe specific examples rather than to limit the present disclosure. As used in the specification and claims of the present disclosure, singular forms of "a", "one", and "the" are intended to include plural forms unless the context clearly indicates other circumstances. It should be further understood that the term "and/or" used in the specification and claims of the present disclosure refers to any combination and all possible combinations of one or more listed relevant items, and the combinations are included.

As used in the specification and claims of the present disclosure, the term "if" may be interpreted as "when", "once", "in response to determining", or "in response to detecting" according to the context. Similarly, phrases such as "if is determined" or "if [the described conditions or events] is detected" may be interpreted as "once is determined", "in response to determining", "once [the described conditions or events] is detected", or "in response to that [the described conditions or events] is detected".

Figure 1:
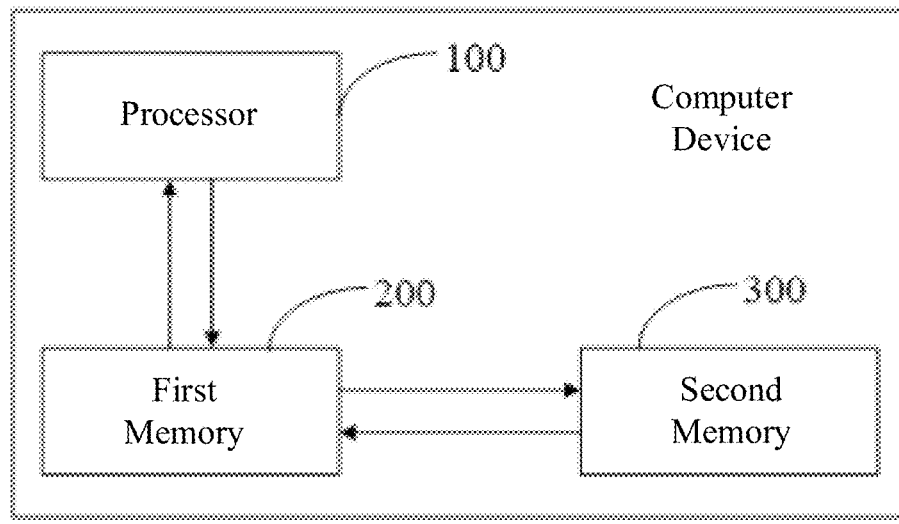
FIG. 1 is a structural diagram of a computer device according to an embodiment of the present disclosure.

As shown in FIG. 1, the computer device of the present disclosure may include a processor 100, a first memory 200, and a second memory 300. The first memory 200 may be disposed close to the processor 100, and the processor 100 may directly exchange data with the first memory 200, that is, the processor 100 may directly read the input data from the first memory 200, and write the output data obtained according to the input data into the first memory 200. The first memory 200 may directly exchange data with the second memory 300, that is, the first memory 200 may read data from the second memory 300, and write data into the second memory. Further, the access speed of the first memory 200 is greater than the access speed of the second memory 300, and the storage capacity of the first memory 200 is smaller than the storage capacity of the second memory 300.

Optionally, the computer device may be a mobile terminal such as a mobile phone or a tablet computer, or a terminal such as a desktop computer, a board card, or a cloud server. The computer device may also be a computer system formed by a cloud server and a terminal such as a mobile phone or a computer. The computer device may be embodied in a robot, a printer, a scanner, a driving recorder, a navigator, a camera, a video camera, a projector, a watch, a mobile storage, a wearable device, a transportation means, a household electrical appliance, and/or a medical device. The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device includes a nuclear magnetic resonance spectrometer, a B-ultrasonic scanner, and/or an electrocardiograph.

Optionally, the first memory 200 may be an internal memory, and the second memory 300 may be an external memory such as a hard disk or the like. For example, the first memory 200 may be a RAM (Random-Access Memory), and the second memory 300 may be a DDR (Double Data Rate, Double Rate Synchronous Dynamic Random First Memory 200). The first memory 200 may be integrated with the processor 100, that is, the first memory 200 is an on-chip memory such as a cache, and the second memory 300 may be an off-chip memory such as an internal memory, for example, RAM.

Optionally, the second memory 300 may be configured to store data and computer programs and the like required by the computer device to perform a particular operation. Further, the data may be machine learning data such as neural network data and the like. Since the storage capacity of the first memory 200 is small, when the processor 100 needs to perform a specific operation, the data required to complete the specific operation stored in the second memory 300 may be written into the first memory 200; and the processor 100 may read the input data required for the specific operation from the first memory 200 to perform the operation, and write the operation result into the first memory 200.

Figure 2:
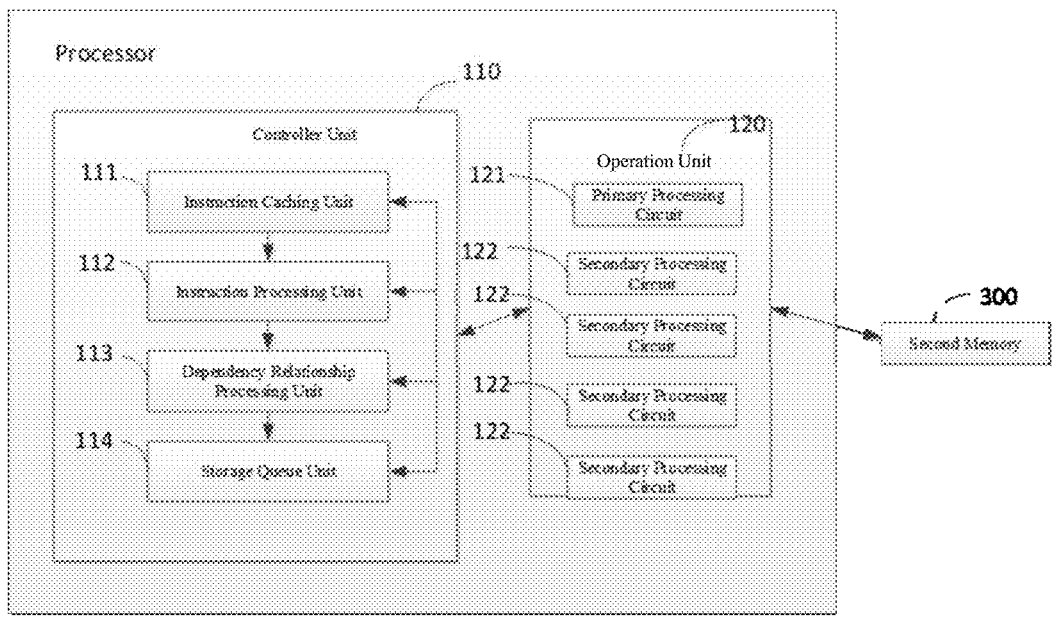
FIG. 2 is a structural diagram of a processor of a computer device according to an embodiment of the present disclosure.

In an embodiment, the processor 100 may include a controller unit 110 and an operation unit 120 as shown in FIG. 2. The controller unit 110 is connected to the operation unit 120, and the operation unit 120 may include a primary processing circuit 121 and a plurality of secondary processing circuits 122, where the primary processing circuit 121 and the secondary processing circuits 122 form a primary-secondary structure. Correspondingly, there are a plurality of first memories 200, and the plurality of first memories 200 may form a storage system of a primary-secondary structure. For example, the plurality of first memories 200 may include one primary memory and a plurality of secondary memories, where the primary memory may be disposed close to the primary processing circuit, and the secondary memories may be disposed close to the secondary processing circuit. The primary memory may be an on-chip memory of the primary processing circuit, and the secondary memories may be on-chip memories of the secondary processing circuit. Further, the storage capacity of the primary memory is smaller than the storage capacity of each secondary memory. Each secondary processor may be configured with one or more secondary memories, which is not specifically limited herein.

Optionally, the controller unit 110 may be configured to obtain data and computation instructions, where the data may include machine learning data such as neural network data and the like. The controller unit 110 may be further configured to parse the obtained computation instructions to obtain an operation instruction, and send the plurality of operation instructions and data to the primary processing circuit. The primary processing circuit 121 may be configured to perform pre-processing on data, and on data and operation instructions transmitted between the primary processing circuit 121 and the plurality of secondary processing circuits 122. The plurality of secondary processing circuits 122 are configured to perform intermediate operations in parallel to obtain a plurality of intermediate results according to the data and operation instructions transmitted from the primary processing circuit 121, and transmit the plurality of intermediate results to the primary processing circuit 121; the primary processing circuit 121 may be further configured to perform subsequent processing on the plurality of intermediate results to obtain the computation results of the computation instructions. The primary processing circuit 121 and each secondary processing circuit 122 are integrated with a first memory, that is, the plurality of first memories may be on-chip memories of the primary processing circuit and the secondary processing circuits, and the second memories may be off-chip memories of the processor.

The controller unit 110 may include an instruction caching unit 111, an instruction processing unit 112, and a storage queue unit 114. The instruction caching unit 111 may be configured to store computation instructions associated with the machine learning data; and the instruction processing unit 112 may be configured to parse the computation instructions to obtain a plurality of operation instructions; the storage queue unit 114 may be configured to store an instruction queue, where the instruction queue may include a plurality of operation instructions or computation instructions to be executed in the order of the queue. The controller unit 110 may further include a dependency relationship processing unit 113 configured to determine, when there are a plurality of operation instructions, whether a first operation instruction is associated with a zeroth operation instruction before the first operation instruction; if the first operation instruction is associated with the zeroth operation instruction, the first operation instruction may be cached into an instruction storage unit, and after the execution of the zeroth operation instruction is completed, the first operation instruction is extracted from the instruction storage unit and transmitted to the operation unit. For example, the dependency relationship processing unit 113 extracts a first storage address space of the required data (for example, a matrix) in the first operation instruction according to the first operation instruction, and extracts a zeroth storage address of the required matrix in the zeroth operation instruction according to the zeroth operation instruction. If the first storage address space and the zeroth storage address space overlap, then the first operation instruction and the zeroth operation instruction have a dependency relationship; and if the first storage address space and the zeroth storage address space do not overlap, then the first operation instruction and the zeroth operation instruction have not a dependency relationship.

Figure 3:
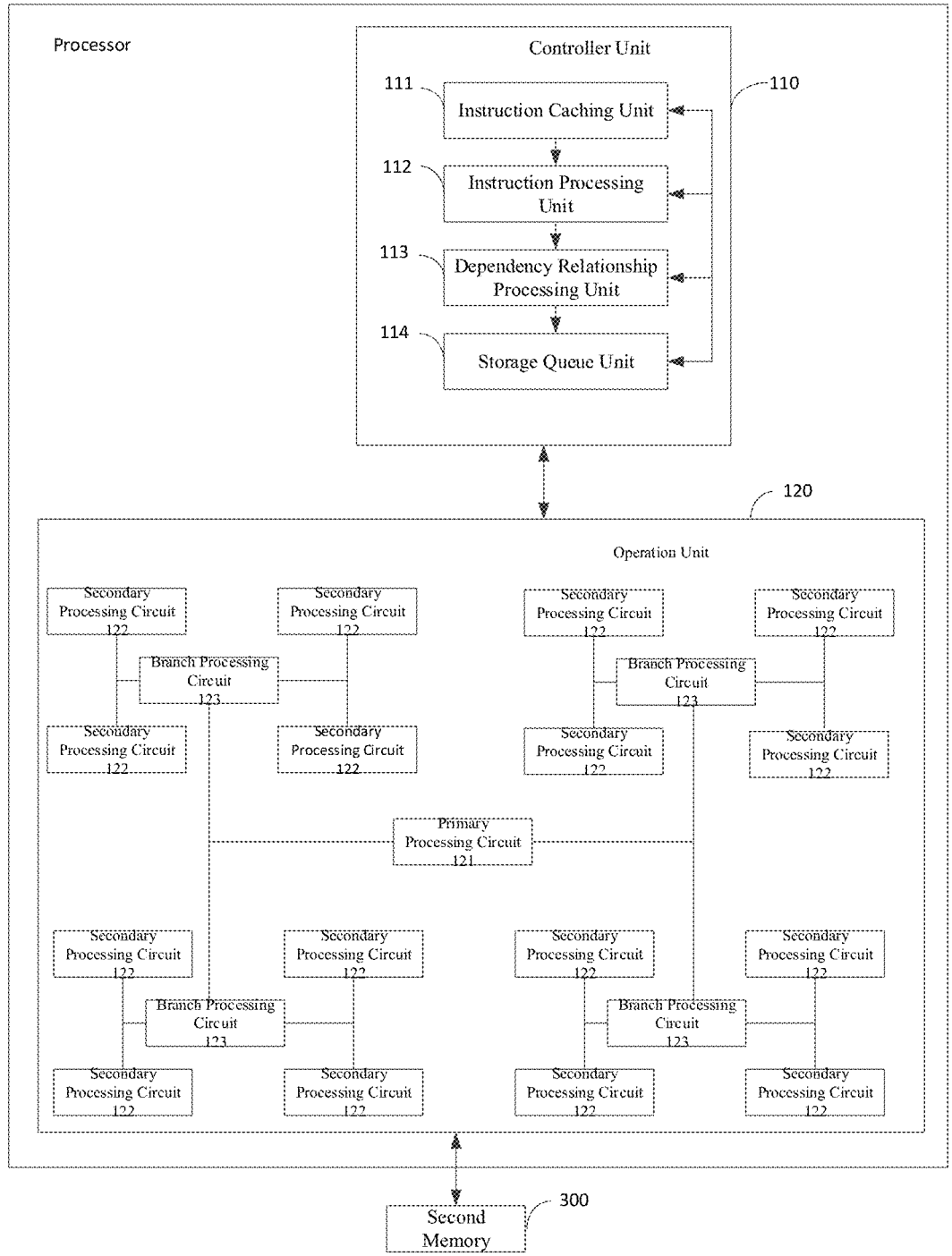
FIG. 3 is a structural diagram of a processor of a computer device according to another embodiment of the present disclosure.

In an embodiment, the operation unit 120 may further include a branch processing circuit 123 as shown in FIG. 3, where the primary processing circuit 121 is connected to the branch processing circuit 123, and the branch processing circuit 123 is connected to the plurality of secondary processing circuits 122, and the branch processing circuit 123 is configured to forward data or instructions between the primary processing circuit 121 and the secondary processing circuit 122. In this example, the primary processing circuit 121 may be configured to split input neurons into a plurality of data blocks, and transmit at least one of the plurality of data blocks, the weight, and at least one of the plurality of operation instructions to the branch processing circuit; the branch processing circuit 123 may be configured to forward the data block, the weight, and the operation instruction between the primary processing circuit 121 and the plurality of secondary processing circuits 122; the plurality of secondary processing circuits 122 may be configured to perform an operation on the received data block and the weight according to the operation instruction to obtain an intermediate result, and transmit the intermediate result to the branch processing circuit 123; and the primary processing circuit 121 may be further configured to perform subsequent processing on the intermediate result forwarded by the branch processing circuit to obtain a result of the computation instruction, and send the result of the computation instruction to the controller unit. Optionally, a first memory may be also integrated on each branch processing circuit 123.

Figure 4:
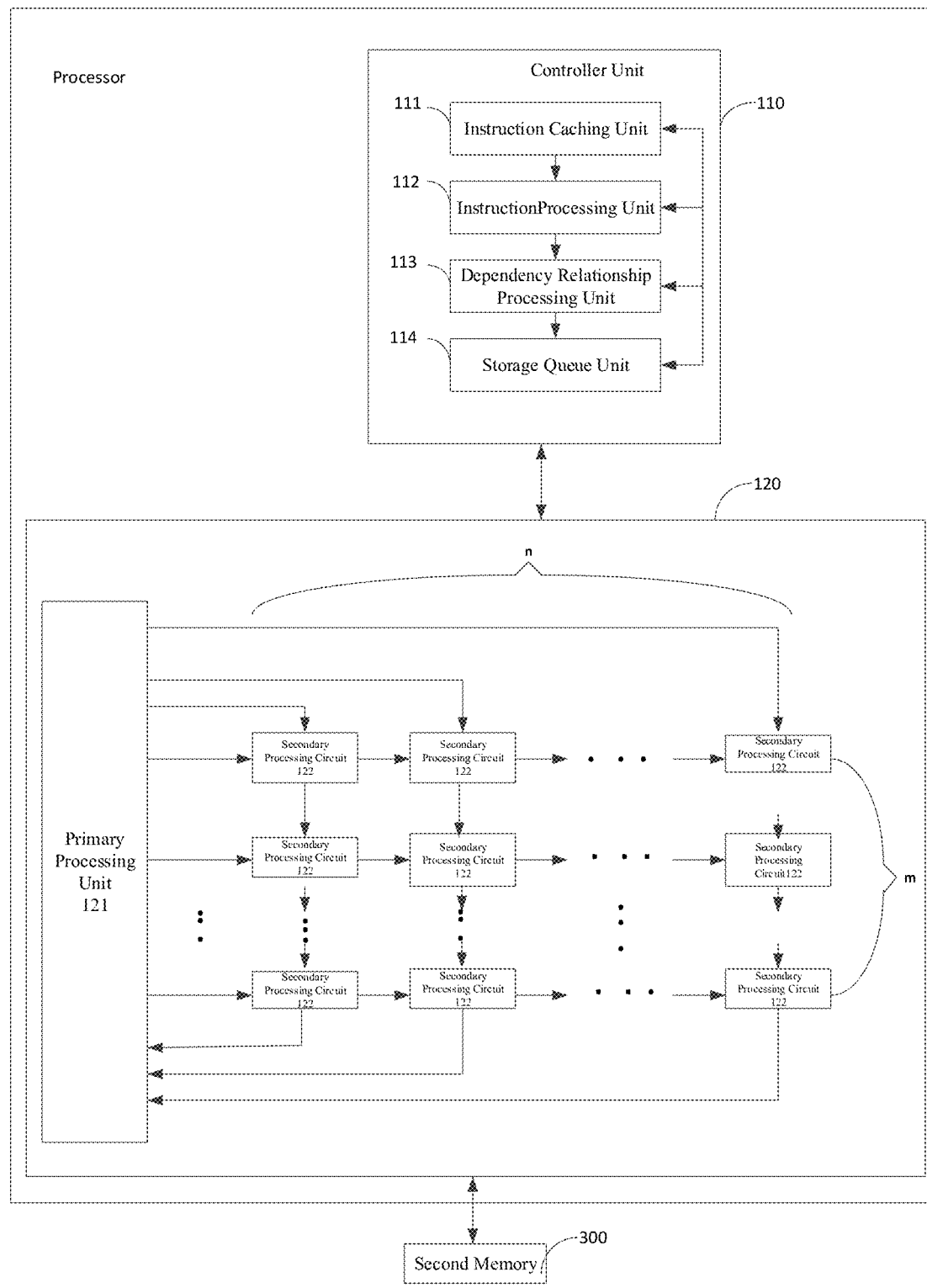
FIG. 4 is a structural diagram of a processor of a computer device according to a third embodiment of the present disclosure.

In another optional example, as shown in FIG. 4, the operation unit 120 may include a primary processing circuit 121 and a plurality of secondary processing circuits 122. The plurality of secondary processing circuits are arranged in an array; each secondary processing circuit is connected to an adjacent secondary processing circuit, and the primary processing circuit is connected to k secondary processing circuits of the plurality of secondary processing circuits. The k secondary processing circuits are: n secondary processing circuits in the first row, n secondary processing circuits in the $m^{th}$ row, and m secondary processing circuits in the first column. It should be noted that the k secondary processing circuits shown in FIG. 1C may include only n secondary processing circuits in the first row, n secondary processing circuits in the m$^{th}$ row, and m secondary processing circuits in the first column, that is, the k secondary processing circuits are the secondary processing circuits directly connected to the primary processing circuit. The k secondary processing circuits are configured to forward data and instruction between the primary processing circuit and the plurality of secondary processing circuits.

The processor provided by the disclosure may set the operation unit into One-Primary Multi-Secondary structure, and for the computation instruction of the forward operation, the data may be split according to the computation instruction of the forward operation, so that the plurality of secondary processing circuits may perform operation in parallel on the portion that involves a large amount of computation, thereby accelerating the operation, saving computation time, and thus reducing power consumption.

Optionally, the machine learning computation may include: an artificial neural network operation, where the input data may include input neuron data and weight data. The computation result may be the result of the neural network operation, i.e., the output neuron data.

The operation of the neural network may be an operation in one layer of the neural network. The implementation process of a multi-layer neural network is: during a forward operation, when an execution of the previous layer of the artificial neural network is completed, the operation instruction of the next layer may compute the output neuron computed by the operation unit as the input neuron of the next layer (or perform some operations on the output neuron, and then take the output neuron as the input neuron of the next layer), and at the same time, the weight is also replaced with the weight of the next layer; during a reverse operation, when the reverse operation of the previous layer of the artificial neural network is completed, the operation instruction of the next layer may compute an input neuron gradient computed by the operation unit as an output neuron gradient of the next layer (or perform some operations on the input neuron gradient, and then take the input neuron gradient as the output neuron gradient of the next layer), and replace the weight with the weight of the next layer.

The machine learning computation may also include a support vector machine operation, a k-nearest neighbor (k-nn) operation, a k-means operation, a principal component analysis operation, and the like. For the convenience of description, the following is an embodiment of artificial neural network operation for illustrating the specific scheme of machine learning computation.

In an artificial neural network operation, if the artificial neural network operation has multi-layer operations, the input neurons and the output neurons of the multi-layer operations do not refer to the neurons in the input layer and the neurons in the output layer of the entire neural network. For any two adjacent layers in the network, the neurons in the lower layer of the network forward operation are the input neurons, and the neurons in the upper layer of the network forward operation are the output neurons. Taking a convolutional neural network as an example, assuming that a convolutional neural network has L layers and K=1, 2, . . . , L−1, for the K$^{th}$ and K+1$^{th}$ layers, the K$^{th}$ layer is taken as an input layer, the neurons in this layer are the input neurons; and the K+1$^{th}$ layer is taken as the output layer, the neurons in this layer are the output neurons. That is, except for the top layer, each layer may be taken as an input layer, and the next layer is the corresponding output layer.

In an embodiment, the second memory may be configured to store a computer program, where the steps of the data pre-processing method provided by the present disclosure may be implemented when the processor executes the computer program, thereby, a storage space allocation rule of various data in the execution process of the operation to be processed may be obtained. For example, the computer device may be configured to perform the following data pre-processing method: performing pre-processing on an operation to be processed (such as a neural network operation) to obtain a storage space allocation rule of the input data, the output data, the intermediate computation result and other data of the operation to be processed in the first memory. Thus, when the processor performs the operation to be processed, the data (input data, output data, intermediate computation result, etc.) involved in the operation to be processed may be stored in the first memory in accordance with the storage space allocation rule. By pre-allocating the storage resources in the operation process, not only the storage space of the first memory may be reasonably utilized, but also the processing speed and accuracy of the processing may be improved. The storage space allocation rule may include a storage address of the input data, a storage address of the output data, a storage address of the intermediate computation result, and an update rule for storing the data in each storage space during the execution of the operation to be processed. Please refer to the description below for details.

Figure 5:
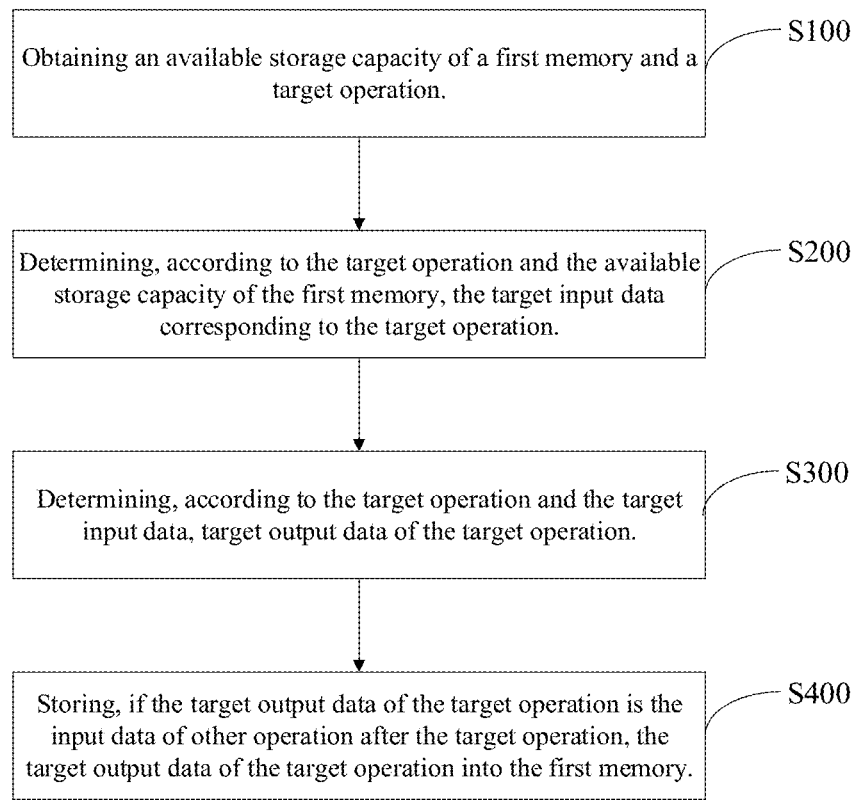
FIG. 5 is a flow chart of a data pre-processing method according to an embodiment of the present disclosure.

In an embodiment of the disclosure, in order to reduce the time of reading and writing data (i.e, reduce the time of I/O operation) in the operation process, a data pre-processing method is provided, and the data pre-processing method may be applied to the computer device. For example, as shown in FIG. 5, the data pre-processing method may include the following steps:

in step S100, obtaining the available storage capacity of the first memory and the target operation.

Specifically, the processor may obtain a total storage capacity of the first memory according to the configuration information of the first memory, such as the model of the first memory. Further, the processor may obtain the available storage capacity of the first memory according to the total storage capacity of the first memory and the occupied storage capacity of the first memory.

In an embodiment of the disclosure, the processor may obtain the operation to be processed, and determine the target operation according to the operation to be processed and the available storage capacity of the first memory. The operation to be processed may include one or more operations, and the operation to be processed may be an operation such as a neural network operation. For example, the operation to be processed may include addition, subtraction, multiplication, division, convolutional operation, pooling operation, and activation operation (for example, Relu) and the like, which is not limited here. The target operation may be a combination of one or more operations to be processed.

The method further includes step S200: determining, according to the target operation and the available storage capacity of the first memory, the target input data corresponding to the target operation, where the target input data is part or all of input data corresponding to the target operation.

Specifically, the processor may determine all the input data required to complete the target operation and the data volume of the total input data (i.e., the storage space size required for the total input data) according to the target operation. Further, the processor may determine the target input data corresponding to the target operation and the data volume of the target input data according to the available storage capacity of the first memory and the data volume of all the input data of the target operation, where the data volume of the target input data is smaller than or equal to the storage capacity of the first memory. The target input data is part or all of input data corresponding to the target operation, that is, the data volume of the target input data is smaller than or equal to the data volume of all input data corresponding to the target operation. When the data volume of the target input data is smaller than the data volume of all the input data of the target operation, by loading only a part of all the input data of the target operation into the first memory, a certain storage space may be reserved in the first memory to store data such as target output data and the intermediate computation result of the target operation. When the data volume of the target input data is equal to the data volume of all the input data of the target operation, storing the data such as the target output data and the intermediate computation result of the target operation may be realized by reusing the storage space.

The method further includes step S300: determining, according to the target operation and the target input data, the target output data of the target operation.

Specifically, since the computation amount of the operation to be processed is statically analyzable, the processor may obtain information such as the target output data of the target operation and the data volume of the target output data according to the target input data of the target operation and the target operation, that is, the processor may obtain the storage space required for the target output data of the target operation.

The method further includes step S400: storing, if the target output data of the target operation is the input data of other operation after the target operation, the target output data into the first memory, to reduce the time of reading the target output data.

Specifically, if the target output data of the target operation is the input data of other operation after the target operation, that is, when the target output data still needs to be used after the target operation, the target output data may be stored into the first memory to reduce the time of reading the target output data, thereby increasing the speed and efficiency of the processor.

In the conventional technology, after the processor performs the target operation to obtain the target output data, the processor may transfer the target output data from the first memory to the second memory, thereby releasing the storage space occupied by the target output data in the first memory. If the operations after the target operation need to continue using the target output data, the processor needs to transfer the target output data from the second memory to the first memory again. In this way, the I/O read operation of the target output data needs to be performed multiple times. The operation time may become be too long, and the efficiency and speed of the processor become low. Compared with the conventional technology, the data pre-processing method provided by the present disclosure may reduce the occupation time of the I/O read operation by reducing the time of reading the target output data, thereby improving the speed and efficiency of the processor.

Figure 8:
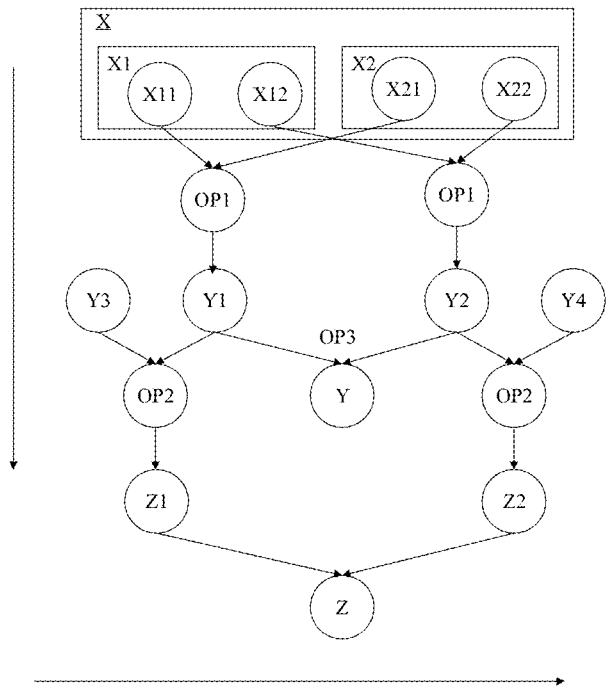
FIG. 8 is a schematic diagram of an operation to be processed according to an embodiment of the present disclosure.

For example, as shown in FIG. 8, the processor may obtain a target operation OP1, and all input data of the target operation OP1 is input data X (which may include sub-input data X11, X21, X12, and X22, where the sub-input data X11 and X12 may constitute input data X1, and the sub-input data X21 and X22 may constitute input data X2, and the input data X1 and X2 may be vector or matrix data, etc.). The processor may take the sub-input data X11 and X21 as the target input data of the target operation OP1 according to the target operation OP1 and the available storage capacity of the first memory. Further, the processor may determine target output data Y1 and the data volume of the target output data Y1 according to the target operation OP1 and the target input data X11 and X21.

Further, the processor may determine, according to a preset operation rule, whether the target output data Y1 needs to be used by other operations after the target operation OP1. If the target output data Y1 needs to be used by other operations after the target operation OP1, for example, if the target output data Y1 is the input data of the operation OP2 after the target operation OP1, the target output data Y1 is temporarily stored in the first memory. Thus, when the operation OP2 becomes the next target operation, before performing the next operation OP2, the processor only needs to transfer the input data Y3 required for the operation OP2 from the second memory to the first memory according to the preset operation rule, and there is no need to transfer the target output data Y1. Further, the target output data Y1 is the input data of the operation OP2 after the target operation OP1, and the target output data Y1 is the input data of the operation OP3. At this time, the target output data Y1 may be stored in the first memory, and after the operations OP2 and OP3 are completed, the target output data Y1 may be deleted from the first memory to release the storage space occupied by the target output data Y1 in the first memory.

The data pre-processing method provided by the present disclosure may shorten the process of transferring the target output data Y1 from the first memory to the second memory after the operation OP1 is completed, and the process of transferring the target output data Y1 from the second memory back to the first memory when performing the operation OP2, thereby the occupation time of the I/O read operation may be reduced by reducing the time of reading the target output data, and the speed and efficiency of the processor may be improved.

Optionally, the operation to be processed may be a neural network operation with a plurality of operation layers. As shown in FIG. 8, the operations OP1 and OP2 may be the operations performed in the layers of the neural network operation. The input data X may be composed of the input data X1 and X2, and may include input neuron data and weight data, and the like. The input data X1 and X2 may belong to different operation layers. Further, the processor may take the sub-input data X11 and X21 as the target input data of the target operation OP1 according to the target operation OP1 and the available storage capacity of the first memory. The processor may further determine the target output data Y1 and the data volume of the target output data Y1 according to the target operation OP1 and the target input data X11 and X21, where the target output data Y1 is a part of the output data of the operation layer OP1, and the output data may include the output neuron data and weight of the operation layer OP1, and the like.

Figure 9:
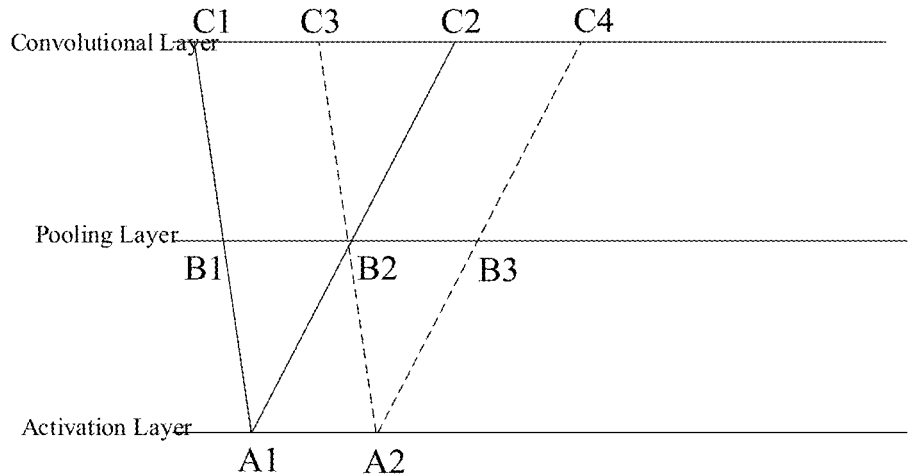
FIG. 9 is a schematic diagram of an operation to be processed according to another example of the present disclosure.

For another example, as shown in FIG. 9, the operation to be processed is an operation such as a neural network operation, and the neural network may include a convolutional layer, a pooling layer, and an activation layer. The execution order of the above operation layers is convolutional operation-pooling operation-activation operation. The output data of the convolutional operation is the input data of the pooling operation, and the output data of the pooling operation is the input data of the activation operation, where the input data of each operation layer may include data such as input neuron data and weight corresponding to the operation layer.

If the current target operation is a pooling operation, the processor may obtain the target input data within a section of C1-C2 corresponding to the pooling operation according to the available storage capacity of the first memory and the target operation, where the data in the section of C1-C2 is the output data of the convolutional operation, which may include the output neuron data and the weight corresponding to the convolutional operation, and the like. The target output data corresponding to the target input data in the section of C1-C2 is the data within a section of B1-B2, where the target output data in the section of B1-B2 may include the output neuron data and the weight corresponding to the pooling operation, and the like. Further, since the target output data in the section of B1-B2 of the pooling operation is the input data of the activation operation, the target output data in the section of B1-B2 of the pooling operation may be stored in the first memory. In this way, after the pooling operation is completed, it is not necessary to transfer the target output data in the section of B1-B2 from the first memory to the second memory, so that the storage space of the first memory will be released. And, it is not necessary to transfer the target output data in the section of B1-B2 from the second memory back to the first memory again before performing the activation operation.

In the conventional technology, after obtaining the target output data B1-B2, the processor may transfer the target output data B1-B2 from the first memory to the second memory firstly to release the storage space of the first memory. Since the input data of the activation operation depends on the output data of the pooling operation, before performing the activation operation, the processor may transfer the target output data B1-B2 corresponding to the pooling operation from the second memory back to the first memory. In the case of limited I/O bandwidth, the above frequent reading data operation will affect the processing efficiency of the processor. Therefore, compared with the prior art, the data pre-processing method provided by the present disclosure may reduce the occupation time of the I/O read operation by reducing the time of reading the target output data (i.e., reducing the loading and storing operation of the target output data), thereby the speed and efficiency of the processor may be improved.

In one embodiment, the method may further include the following step:
storing, if the target output data of the target operation is the input data of other operation after the target operation (that is, the target output data of the target operation is the intermediate result data of the operation to be processed), the target output data of the target operation into the first memory, or the first memory and the second memory. For example, if the target output data of the target operation is the input data of other operation after the target operation, the target output data may be stored in the first memory to reduce the repeated loading operation of the target output data (i.e., reduce the loading operation of the target output data). At the same time, the target output data may be copied from the first memory to the second memory to ensure the consistency of data in the first memory and the second memory. Optionally, whether the target output data corresponding to the target operation needs to be synchronously stored in the second memory may be determined according to a specific operation requirement.

If it is not necessary to synchronously store the target output data into the second memory, the target output data may be stored only into the first memory, thereby simultaneously reducing the loading and storing operations of the target output data. If the target output data needs to be synchronously stored into the second memory, the target output data may be synchronously stored into the first memory and the second memory; by reducing the loading operation of the target output data, the excessive I/O bandwidth occupied by the frequent reading data operations could be avoided, and improves the processing speed of the processor.

As shown in FIG. 8, if the target output data Y1 needs to be used by other operations after the target operation OP1, for example, if the target output data Y1 is the input data of the operation OP2 after the target operation OP1, the target output data Y1 is temporarily stored in the first memory. Thus, when the operation OP2 becomes the next target operation, before performing the next operation OP2, the processor only needs to transfer the input data Y3 required for the operation OP2 from the second memory to the first memory according to the preset operation rule, and there is no need to transfer the target output data Y1. Further, the target output data Y1 is the input data of the operation OP2 after the target operation OP1, and the target output data Y1 is the input data of the operation OP3. At this time, the target output data Y1 may be stored in the first memory, and after the operations OP2 and OP3 are completed, the target output data Y1 may be deleted from the first memory to release the storage space occupied by the target output data Y1 in the first memory.

As shown in FIG. 9, since the target output data B1-B2 of the pooling operation is the input data of the activation operation, the target output data B1-B2 of the pooling operation may be simultaneously stored in the first memory and the second memory. Therefore, it is not necessary to transfer the target output data B1-B2 from the second memory to the first memory again before the activation operation is performed. At the same time, after the pooling operation is completed, copying the target output data B1-B2 from the first memory to the second memory may ensure the consistency of the data in the first memory and the second memory. The data pre-processing method provided by the embodiment of the present disclosure reduces the process of re-transferring the target output data B1-B2 from the second memory to the first memory compared to the prior art; by reducing the time of reading the target output data, the occupation time of the I/O read operation during the operation may be reduced, thus the speed and efficiency of the processor will be improved.

In an embodiment, since the data volume of all the input data required for each target operation of the operations to be processed is large, the processor may split all the input data involved in each target operation, that is, the processor may split all the input data (including the input neuron data and the weight, etc.) involved in each target operation into a plurality of input data blocks according to the available storage capacity of the first memory, and the processor may further respectively perform the target operation for each input data block to obtain a computation result of the target operation. Finally, the processor may obtain the output data corresponding to the target operation by fusing the computation results corresponding to the respective input data blocks. The input data block is the target input data described above, and the output data corresponding to each input data block is the target output data. Optionally, the step S200 may include:
determining, by the processor, the input data block corresponding to the target operation according to the available storage capacity of the first memory and the data volume of the input data required for the target operation; and taking, by the processor, the input data block as the target input data corresponding to the target operation. For example, if the data volume of all the input data required for the target operation is greater than the available storage capacity of the first memory, the processor may determine, according to the available storage capacity of the first memory, the input data block corresponding to the target operation, where the input data block may be part of all the input data of the target operation. If the data volume of all the input data required for the target operation is smaller than or equal to the available storage capacity of the first memory, all the input data of the target operation may be taken as one input data block, that is, all the input data of the target operation may be taken as its target input data.

For example, as shown in FIG. 8, the processor may obtain the current target operation OP1, where all the input data of the target operation OP1 is the input data X (which may include input data X1 and X2). The processor may take the sub-input data X11 and X21 as the target input data of the target operation OP1 according to the target operation OP1 and the available storage capacity of the first memory, where the sum of the data capacities of the sub-input data X21 and the sub-input data X11 is smaller than the available storage capacity of the first memory. In other embodiments, if the data volume of all the input data X corresponding to the target operation is smaller than the available storage capacity of the first memory, all the input data corresponding to the target operation may be loaded into the first memory.

For another example, as shown in FIG. 9, if the current target operation is a pooling operation, the processor may take the data within the section of C1-C2 as an input data block according to the available storage capacity of the first memory and the target operation, where the data in the section of C1-C2 is the output data of the convolutional operation; and the processor may take the input data block as the target input data corresponding to the pooling operation. If the current target operation is an activation operation, the processor may take the data in the section of B1-B2 as an input data block of the activation operation according to the available storage capacity of the first memory; and the processor may take the input data block as the target input data of the activation operation.

Figure 6:
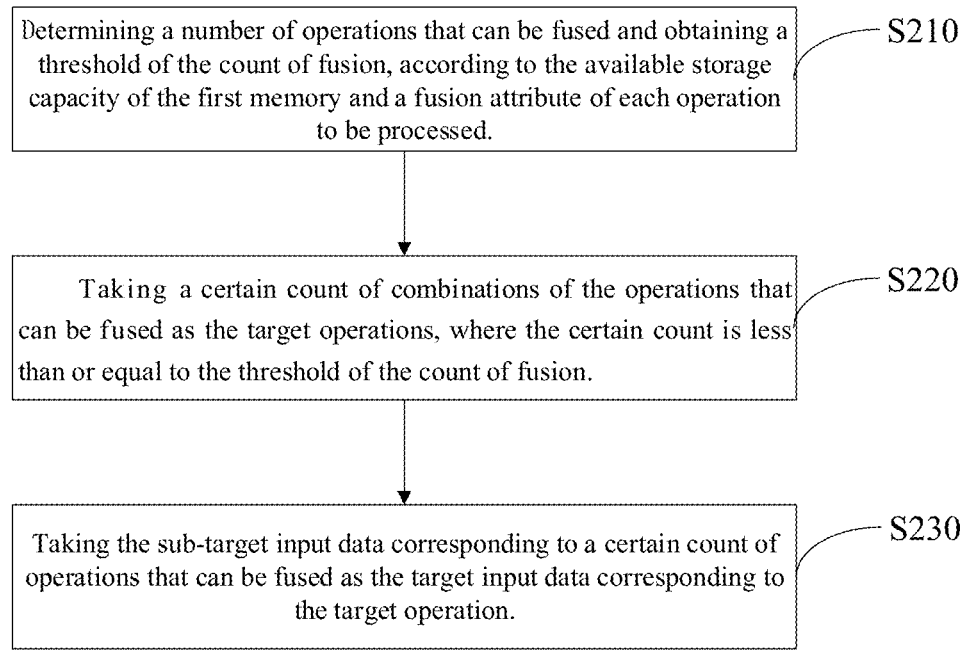
FIG. 6 is a flow chart of an embodiment of the step of determining the target input data as shown in FIG. 5.

In an embodiment, when all the input data involved in each target operation is split into a plurality of input data blocks, since the data volume of each input data block is smaller than the storage capacity of the first memory, the target operation may fuse the plurality of operations to be processed to make full use of the storage space of the first memory and improve the efficiency of the operation. Optionally, the target operation may include one or more operations, that is, the target operation may be a combination of one or more operations. Generally, each operation included in the target operation is a different operation for implementing different operations. At this time, the processor may determine the sub-target input data corresponding to each operation according to the available storage capacity of the first memory, and determine the target input data corresponding to the target operation according to the sub-target input data corresponding to each operation. As shown in FIG. 6, the determining of the input data block corresponding to the target operation described in the step S200 may further include the following steps:

in step S210, determining, according to the available storage capacity of the first memory and the fusion attribute of each operation, the count of operations that can be fused and obtaining the threshold of the count of fusion, where the fusion attribute of each operation may include the data dependency relationship between the input data and/or the output data involved in each operation, and the like.

It should be clear that if one or more of the operations can be performed by the processor together, then the one or more operations may be fused, the degree of fusion is high. If one or more of the operations cannot be performed together by the processor, then the one or more operations may not be fused, and the degree of fusion is low. The degree of fusion between each operation may be determined by a preset operation rule, which is not specifically limited herein.

The method further includes step S220: taking a certain count of combinations of one or more operations that can be fused as the target operations, where the certain count may be less than or equal to the threshold of the count of fusion. For example, the certain count is equal to the threshold of the count of fusion, that is, a plurality of operations that can be fused determined according to the storage capacity of the first memory are equivalent to one target operation.

The method further includes step S230: taking the sub-target input data corresponding to a certain count of operations as the target input data corresponding to the target operation.

For example, as shown in FIG. 8, the operations to be processed may include the operations OP1 and OP2, which may be performed together by the processor according to the fusion attributes of the two operations. When the first memory contains the target input data and the target output data of the operation OP1 and the target input data and the target output data of the operation OP2, and the count of the target operations that can be fused is 2, at this time, the operations OP1 and OP2 may be taken as one target operation, and the sub-target input data X11, X21, and Y3 corresponding to the operations OP1 and OP2 may be taken as the target input data of the target operation.

If the operations OP1 and OP2 can be fused, but the first memory can only hold the target input data and the target output data of the operation OP1 and cannot completely accommodate the target input data and the target output data of the operation OP2, and the count of the target operations that can be fused may be 1, then the operation OP1 may be taken as one target operation and the sub-target input data X11 and X21 corresponding to the operation OP1 may be taken as the target input data of the target operation.

In other embodiments, the target operation may include more than 2 operations. For example, in the depth direction of the operations to be processed, if there are other operations that can be fused after the operation OP2, and the data volume of the target input data and the target output data corresponding to the operations that can be fused can satisfy the available storage capacity of the first memory, the operation included in the target operations may be OP1, OP2, and OPn (where n is a positive integer greater than 2). The sum of the data volume of the target input data and the target output data corresponding to OP1, OP2, and OPn is less than or equal to the available storage capacity of the first memory.

Further, the operations to be processed may be operations such as a neural network operation, and the neural network operation may include a plurality of operation layers, each operation layer may represent an operation. For example, the processor needs to perform operations on the neural network, and each operation layer of the neural network may be taken as an operation. The fusion attribute of each operation may be determined according to the connection relationship of each operation layer of the neural network operation. That is, according to the connection relationship of each operation layer of the neural network, which operation layers will be fused and the count of operation layers that can be fused may be determined, and a combination of one or more operations layer that can be fused may be taken as one target operation. In this way, by fusing a plurality of operation layers in the depth direction of the neural network as one target operation, the count of operations and the time of reading data can be reduced, and the processing efficiency of the processor can be further improved.

For example, as shown in FIG. 9, according to the connection relationship of each operation layer of the neural network, it can be determined that the convolutional operation, the pooling operation, and the activation operation may be fused in the depth direction of the neural network. At this time, the processor may determine the threshold of the count of fusion according to the available storage capacity of the first memory, the data volume of the target input data of each operation, and the like. For example, if the first memory is capable of containing the target input data in the section of C1-C2 of the pooling operation and the target input data in the section of B1-B2 of the activation operation, the threshold of the count of fusion may be determined to be 2, and the pooling operation and the activation operation are equivalent to one target operation. At this time, the target input data of the target operation may be data in the section of C1-C2. In other embodiments, the target operation may also be a fusion of a convolutional operation, a pooling operation, and an activation operation.

When there are other operations to be performed after the activation operation, the target operations may further fuse more operations according to the available storage capacity of the first memory. For example, the neural network may include N operation layers, and the processor may determine that the threshold of the count of fusion is n according to the available storage capacity of the first memory (where n is greater than or equal to 1, and n is less than or equal to N), and the n operation layers may be taken as one target operation. This is for illustrative purposes only and is not intended to limit the scope of this disclosure.

Further, when the target operation includes a plurality of operations, the intermediate computation results obtained in the execution process of the target operation may also be stored in the first memory. The method may further include the following step:

temporarily storing, by the processor, the intermediate computation result output by the current operation into the first memory, if the intermediate computation result output by the current operation of the target operations needs to be taken as the input data of other operation after the current operation, or the intermediate computation result output by the current operation needs to be taken as the input data of other target operation. For example, the processor may allocate a storage address for the intermediate result output by the current operation in the first memory according to the data volume of the intermediate result output by the current operation.

The method may further include the following step:

reallocating the storage space occupied by the intermediate result output by the current operation, if the other operation after the current operation or other target operation does not need to use the intermediate computation result output by the current operation. That is, the storage address occupied by the intermediate result of the current operation may be allocated to other data.

For example, as shown in FIG. 8, when the intermediate computation result Y1 output by the current operation OP1 is the input data of the next operation OP2, the processor may temporarily store the intermediate computation result Y1 output by the current operation into the first memory. Thus, the time of reading the intermediate computation result Y1 may be reduced, then the efficiency and speed of the processor may be improved. If the operation OP2 does not need to continue to use the intermediate computation result, and the other target operations after the target operation do not need to reuse the intermediate computation result Y1, the storage space occupied by the intermediate computation result Y1 may be released, and the storage address occupied by the intermediate computation result Y1 may be allocated to other data, for example, the target output data of the other target operations after the current target operation may be stored into the storage space occupied by the intermediate computation result to reuse the storage space in the first memory.

For another example, as shown in FIG. 9, the target input data of the pooling operation is the data stored in the section of C1-C2, and the target output data corresponding to the target input data is the data stored in the section of B1-B2. The processor may temporarily store the intermediate computation result in the section of B1-B2 into the first memory since the data in the section of B1-B2 is the target input data of the pooling operation. In this way, the time of reading the intermediate computation result in the section of B1-B2 are reduced, so that the processing efficiency and speed of the processor can be improved. If the activation operation does not need to use the target operation output data in the section of B1-B2, the storage space occupied by the target output data in the section of B1-B2 may be allocated to other data to reuse the storage space in the first memory.

Figure 7:
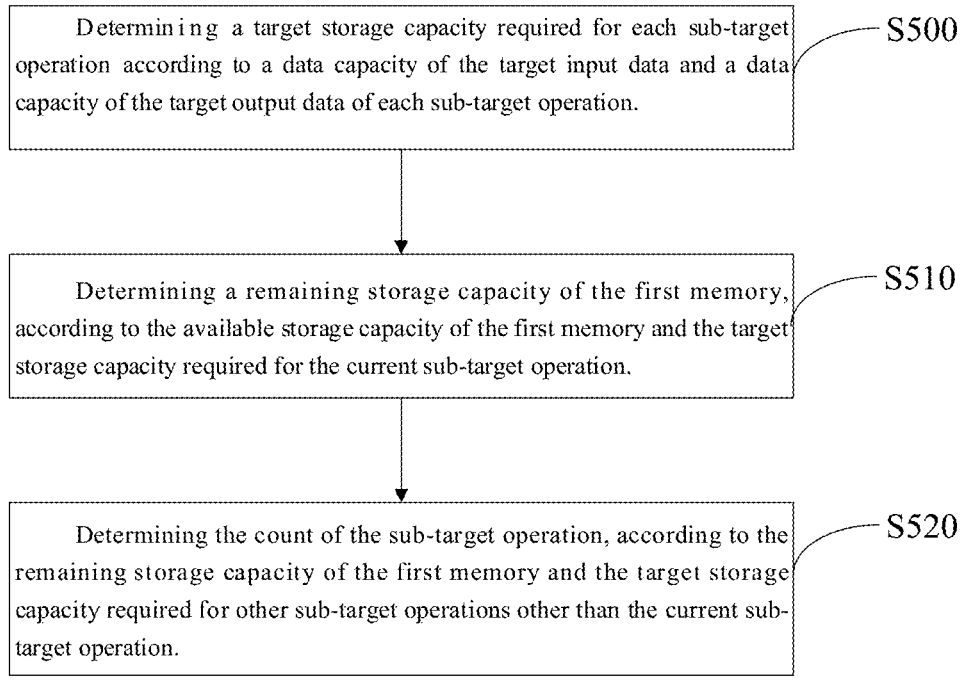
FIG. 7 is a flow chart of an embodiment of determining the count of target operation according to the data pre-processing method as shown in FIG. 5.

In an embodiment, when the target input data of the target operation is only a part of all the input data corresponding to the target operation, each target input data of the target operation may be needed for completion of a part of the target operations. In order to improve the processing speed of the target operation and make full use of the storage space of the first memory, the count of the target input data corresponding to the target operation may be one or more, and each target input data is a part of all the input data, that is, each target input data may contain one or more input data blocks of all the input data, and one or more target input data may be loaded to the first memory at the same time. Further, according to the count of the target input data, the target operation may be split into a plurality of sub-target operations, and optionally, each sub-target operation may achieve the same operation. As shown in FIG. 7, the method may further include the following steps:

in step S500, determining, according to the capacity of the target input data and the capacity of the target output data, the target storage capacity required for each sub-target operation; where the target storage capacity required for each sub-target operation may be equal or not;

in step S510, determining, according to the available storage capacity of the first memory and the target storage capacity required for the current sub-target operation, the remaining storage capacity of the first memory; and in step S520, determining, according to the remaining storage capacity of the first memory and the target storage capacity required for each sub-target operation, the count of the sub-target operations.

Optionally, how many sub-target operations may be contained in the first memory can be determined according to the remaining storage capacity of the first memory and the target storage capacity of the other sub-target operations other than the current sub-target operation. Then, the total count of sub-target operations can be determined according to the current operation and the count of other sub-target operations other than the current operation.

Specifically, whether or not one or more sub-target operations may be performed can be determined according to the remaining storage capacity of the first memory, when the sum of the data volume of the target input data of the current sub-target operation and the data volume of the target output data is smaller than the available storage capacity of the first memory. If one or more sub-target operations are to be performed, the processor may simultaneously process the target input data corresponding to the one or more sub-target operations. In this way, by processing multiple target input data at the same time, the processing speed and efficiency of the processor can be further improved.

As shown in FIG. 8, the target operation (the operation on the left side in FIG. 8) may include the operations OP1 and OP2, and the processor may determine the data volume of the target input data X11, X21, and Y3 of the current sub-target operation of the target operation, and determine the data volume of the target output data Y1 and Z1 of the current sub-target operation. Furthermore, the processor may determine the target storage capacity required for the current sub-target operation according to the sum of the target input data of the current sub-target operation and the data volume of the target output data. If the target storage capacity of the current sub-target operation is smaller than the available storage capacity of the first memory, the remaining storage capacity of the first memory may be determined. The remaining storage capacity of the first memory is equal to the difference between the available storage capacity of the first memory and the target storage capacity of the current sub-target operation. Then, the processor may determine the count of sub-target operations according to the remaining storage capacity of the first memory.

Specifically, if the remaining storage capacity of the first memory is further capable of holding the target input data X12, X22, and Y4 of another sub-target operation, the intermediate computation result Y2 output by the operation OP1, and the target output data Z2 output by the operation OP2, the count of the target operations can be determined to be 2, and the sub-input data X21, X22, and Y4 may be taken as the target input data of one of the target operations. In this way, by simultaneously loading the plurality of target input data of the same target operation in the lateral direction of the operations to be processed, the processor may process the plurality of target input data in parallel, which can further improve the processing speed and efficiency of the processor.

Further, in addition to the target input data X12, X22, and Y4 of another sub-target operation, the intermediate computation result Y2 output by the operation OP1, and the target output data Z2 output by the operation OP2, if the remaining storage capacity of the first memory also contains the output data Y of the operation OP3, then the operations OP1, OP2, and OP3 may be fused to obtain the computation result Y by one operation.

As shown in FIG. 9, the operation to be processed may be a neural network operation, and the neural network may include a convolutional layer, a pooling layer, and an activation layer. The execution order of the above operation layers is convolutional operation-pooling operation-activation operation. If the target operation is an activation operation, the processor may obtain the target input data of the current sub-target operation according to the storage capacity of the first memory, where the target input data of the current sub-target operation may be the input data stored in the section of B1-B2 in the convolutional layer, and the target output data of the current sub-target operation is A1. If the sum of the data volume of the target input data in the section of B1-B2 of the current sub-target operation and the data volume of the corresponding target output data is smaller than the storage capacity of the first memory, that is, the target storage capacity required for the current sub-target operation is smaller than the storage capacity of the first memory, the processor may further determine the count of the sub-target operations according to the remaining storage capacity of the first memory. For example, the processor may determine, according to the remaining storage capacity of the first memory, that the remaining storage capacity of the first memory is capable of containing the operation amount of the activation operation in a section of A1-A2, and determine that the count of sub-target operations is 2, and then the target input data in the section of B2-B3 may be taken as the target input data corresponding to one target operation of the activation operation.

Further, if the target input data of at least two sub-target operations intersects, the intersection of the target input data of the current sub-target operation and the target input data of the other sub-target operations may be determined, and the intersection may be temporarily stored into the first memory. That is, when part or all of the target input data of the current sub-target operation is taken as the target input data of another operation, the intersection may be temporarily stored into the first memory to avoid multiple reading of the part of the data, which can improve the processing efficiency and speed of the processor.

For example, as shown in FIG. 9, if the target operation is a pooling operation and the count of sub-target operations of the target operation is 2, correspondingly, the count of target input data corresponding to the pooling operation may be 2, where one of the target input data is in a section of C1-C2, and another target input data is in a section of C3-C4. The target output data corresponding to the target input data in the section of C1-C2 is in the section of B1-B2, and the target output data corresponding to the target input data in the section of C3-C4 is in the section of B2-B3. Combined with the attached drawings, it can be seen that the input data in the section of C3-C2 is a part of the target input data in the section of C1-C2, and is also a part of the target input data in the section of C3-C4, that is, there is an intersection C3-C2 between the two target input data. At this time, in order to reduce the time of reading data, after completing the pooling operation corresponding to the target input data in the section of C1-C2, the input data in the section of C3-C2 may be stored into the first memory to avoid multiple reading of the part of the data, which can improve the processing efficiency and speed of the processor.

In an embodiment, the method may further include the following step:

storing, if an operation interval between the operation after the target operation and the target operation is within a preset range, the target output data into the first memory to reduce the time of reading the target output data.

Specifically, if the operation interval between the other operation after the target operation and the target operation is within a preset range, for example, when there are 3 to 5 operations between the target operation and the other operation after the target operation, the target output data may be stored into the first memory to reduce the time of reading the target output data. If the operation interval between the other operation after the target operation and the target operation exceeds the preset range, the output data may be transferred from the first memory to the second memory in order to avoid the target output data of the target operation occupying the storage space of the first memory for a long time.

In an embodiment, the method may further include the following steps:

determining, by the processor, the storage address of the target input data in the first memory according to the data volume of the target input data of the target operation; determining, by the processor, the storage address of the target output data in the first memory according to the data volume of the target output data of the target operation.

Specifically, the processor may allocate, according to the data volume of the target input data of the target operation, a storage space for the target input data matching the data volume thereof in the first memory, and allocate a storage address of the storage space for the target input data. Thus, in the actual operation, the target input data may be stored into the specified storage space in the first memory. In the same way, the processor may allocate, according to the data volume of the target output data of the target operation, a storage space for the target input data matching the data volume thereof in the first memory, and allocate a storage address of the storage space for the target output data. Thus, in the actual operation, the target output data may be stored into the specified storage space in the first memory.

In an embodiment, the method may further include the following steps:

allocating, by the processor, if the target input data of the target operation does not need to be used continuously, part or all of the storage address of the target input data to the target output data of the target operation. In this way, the space utilization of the first memory may be improved by reusing a same storage space multiple times.

Optionally, the processor may record the storage address of the target input data, the storage address of the target output data, and the storage address of the intermediate computation result of each target operation, as well as an update rule of each storage space in the first memory, and the like. The processor may further obtain a storage allocation rule corresponding to the operation to be processed according to the storage address corresponding to the data. When the processor needs to perform the operation to be processed, the processor may obtain the storage allocation rule corresponding to the operation to be processed, and determine the read/write operation and the storage address of various data during the operation process according to the storage allocation rule.

In an embodiment, the data pre-processing method may be applied to the computer device shown in FIG. 2 to FIG. 4. At this time, according to the preset operation allocation rule, a part of the target operation needs to be performed by the primary processing circuit, and another part of the target operation needs to be performed by the secondary processing circuit. Accordingly, the plurality of first memories may include the primary memory and the secondary memory. The primary memory may be close to the primary processing circuit, and the primary memory may be an on-chip memory of the primary processing circuit; the secondary memory may be close to the secondary processing circuit, and the secondary memory may be an on-chip memory of the secondary processing circuit. At this time, a part of the target input data corresponding to the target operation needs to be loaded into the primary memory and performed by the primary processing circuit, and another part of the target input data corresponding to the target operation needs to be loaded into one or more secondary memories and performed by the secondary processing circuit corresponding to each secondary memory.

Figure 10:
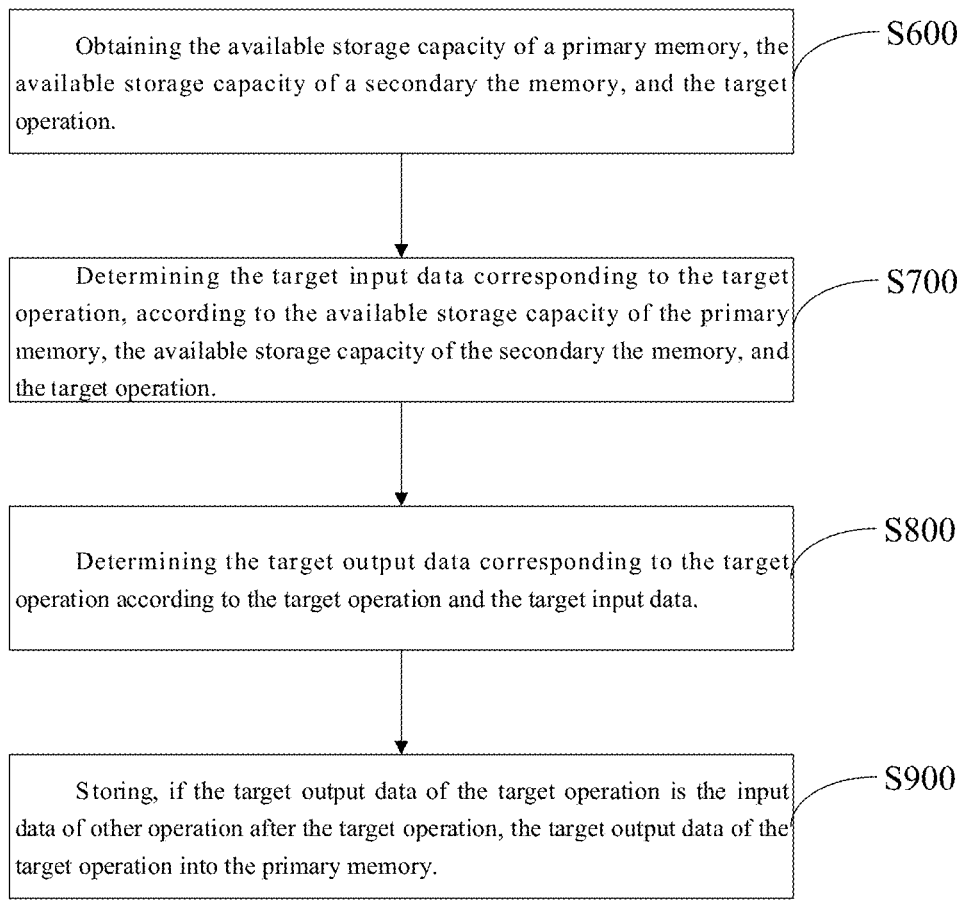
FIG. 10 is a flow chart of a data pre-processing method according to another example of the present disclosure.

Specifically, as shown in FIG. 10, the computer device shown in FIG. 2 to FIG. 4 executes the data pre-processing method, which may include the following steps:

in step S600, obtaining the available storage capacity of the primary memory, the available storage capacity of the secondary memory, and the target operation.

Specifically, the processor may obtain the total storage capacity of the primary memory according to the configuration information of the primary memory, such as the model of the primary memory. Further, the processor may obtain the available storage capacity of the primary memory according to the total storage capacity of the primary memory and the storage capacity already occupied by the primary memory. The processor may also obtain the total storage capacity of the secondary memory according to the configuration information of the secondary memory, and obtain the available storage capacity of the secondary memory according to the total storage capacity of the secondary memory and the storage capacity already occupied by the secondary memory. Optionally, the primary processing circuit of the processor may obtain the available storage capacity of the primary memory, and each secondary processing circuit may obtain the available storage capacity of the corresponding secondary memory, and transfer the corresponding available storage capacity of the secondary memory to the primary processing circuit.

At the same time, the controller unit of the processor may obtain the operation to be processed, and send data such as an analysis result of the operation to be processed to the primary processing circuit. The primary processing circuit may determine the target operation according to the operation to be processed, the available storage capacity of the primary memory, and the available storage capacity of the secondary memory. Optionally, the operation to be processed may include addition, subtraction, multiplication, division, convolutional operation, pooling operation, and activation operation (for example, Relu) and the like, which is not limited here. The target operation may be a combination of one or more operations to be processed.

The method further includes step S700: determining the target input data corresponding to the target operation according to the available storage capacity of the primary memory, the available storage capacity of the secondary memory, and the target operation; where the target input data is part or all of the input data corresponding to the target operation.

For example, the primary processing circuit of the processor may determine all the input data required for completing the target operation and the data volume of all the input data (i.e., a storage space size required for all input data) according to the target operation. Further, the primary processing circuit may determine the target input data corresponding to the target operation and the data volume of the target input data according to the available storage capacity of the primary memory, the available storage capacity of each secondary memory, and the data volume of all the input data of the target operation.

The method further includes step S800: determining the target output data corresponding to the target operation according to the target operation and the target input data.

Specifically, since the computation amount of the operation to be processed is statically analyzable, the primary processing circuit of the processor may obtain information such as the target output data of the target operation and the data volume of the target output data according to the target input data of the target operation and the target operation, that is, the primary processing circuit of the processor may obtain the storage space required for the target output data of the target operation.

The method further includes step S900: correspondingly storing, if the target output data of the target operation is the input data of other operation after the target operation, the target output data into the primary memory.

Specifically, the primary processing circuit may allocate the target input data corresponding to the target operation to the primary memory and the secondary memory according to the preset operation allocation rule, so that the primary processing circuit and the secondary processing circuit may perform the target operation in cooperation. During the execution of the target operation, the secondary processing circuit may process the target input data of the secondary memory to obtain an intermediate computation result, and then send the intermediate computation result to the primary processing circuit. The primary processing circuit may process the target input data of the primary memory, and then obtain the target output data of the target operation according to the intermediate computation results transmitted by each secondary processing circuit. If the target output data corresponding to the target operation is the input data of the other operation after the target operation, the target output data may be stored into the primary memory, thereby reducing the time of reading the data and improving the computation speed of the processor.

Figure 11:
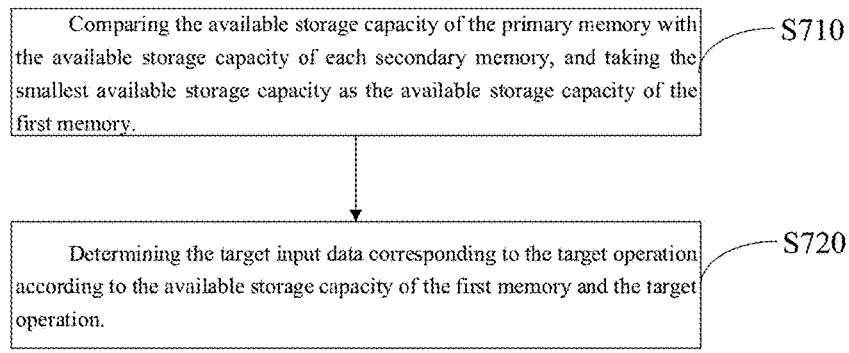
FIG. 11 is a flow chart of an embodiment of the step of determining the target input data as shown in FIG. 10.

In an embodiment, as shown in FIG. 11, the step S700 may further include:
- in step S710, comparing the available storage capacity of the primary memory with the available storage capacity of each secondary memory, and taking the smallest available storage capacity as the available storage capacity of the first memory; and
- in step S720, determining the target input data corresponding to the target operation according to the available storage capacity of the first memory and the target operation.

Specifically, since the target operation needs to be completed jointly by the primary circuit and the secondary circuit, the storage space of the primary memory and the secondary memory should simultaneously contain the target input data of the target operation, that is, the data volume of the target input data should be smaller than the available storage capacity of the primary storage, and the data volume of the target input data should be smaller than the available storage capacity of the secondary storage. Thus, the available memory capacity of the primary memory may be compared to the available memory capacity of each secondary memory, and the minimum available memory capacity of the primary memory and each secondary memory may be taken as the available memory capacity of the first memory of the processor. Thereafter, the primary processing circuit may determine the target input data corresponding to the target operation according to the available storage capacity of the first memory and the target operation.

In an embodiment, the primary processing circuit may split the target input data into a plurality of data blocks according to the preset operation allocation rule, and determine a processing circuit corresponding to each data block. The data block processed by the primary processing circuit in the target input data may be recorded as first target input data, and the data block processed by the secondary processing circuit in the target input data may be recorded as second target input data. Further, the data volume of the second target input data corresponding to each secondary processing circuit may be unequal, which may be determined by the operation allocation rule. The method may further include the following steps:
- determining, according to the preset operation allocation rule, the first target input data corresponding to the primary memory, and the second target input data corresponding to each secondary memory. For example, the primary processing circuit may determine, according to the preset operation allocation rule, which target input data of the target operation may be processed by the primary processing circuit, and which target input data of the target operation may be processed by each secondary processing circuit.

For example, as shown in FIG. 9, the current target operation is a pooling operation, if it is necessary to complete the operation in the section of B1-B2 in the pooling layer, at this time, the target input data required for the target operation is in the section of C1-C2. According to a preset operation allocation rules, the primary processor may take the input data in the section of C1-C3 as the second target input data and store the second target input data in the section of C1-C3 into the secondary memory, take the input data in the section of C3-C2 as the first target input data and store the first target input data in the section of C3-C2 into the primary memory.

Further, the method may further include the following steps:
- determining, by the processor, the storage address of the first target input data in the primary memory according to the available storage capacity of the primary memory and the data volume of the first target input data. For example, the primary processing circuit may determine the storage address of the first target input data in the primary memory according to the available storage capacity of the primary memory and the data volume of the first target input data. Further, according to the data volume of the first target input data and the target operation, the primary processing circuit may determine the first target output data corresponding to the first target input data and the data volume thereof, and determine the storage address of the first target output data in the primary memory.

The processor may further determine the storage address of the second target input data in the secondary memory according to the available storage capacity of the secondary memory and the data volume of the second target input data. For example, the primary processing circuit may determine, according to the available storage capacity of each secondary processing circuit and the data volume of the corresponding second target input data, the storage address of each second target input data in its corresponding secondary memory. Further, according to the data volume of each second target input data and the target operation, the primary processing circuit may determine the second target output data corresponding to each second target input data and the data volume thereof, and determine the storage address of each second target output data in its corresponding secondary memory.

Further, each secondary processing circuit may transmit the second target output data after computing to the primary processing circuit, and the primary processing circuit may further determine the storage address of each second target output data in the primary memory.

In an embodiment, if the other operations performed on the processing circuit need to continue to use the corresponding second target output data, the second target output data may be temporarily stored into the secondary memory corresponding to the secondary processing circuit. In this way, the time of reading data between the primary memory and the secondary memory may be reduced, and the operation speed of the processor may be further improved.

In an embodiment, the target operation may include one or more operations, that is, the target operation may be a combination of one or more operations. Generally, each operation included in the target operation is a different operation for implementing different operations. At this time, the primary processing circuit of the processor may determine the sub-target input data corresponding to each operation according to the available storage capacity of the first memory, and determine the target input data corresponding to the target operation according to the sub-target input data corresponding to each operation. The process of determining the target input data is consistent with the steps S210 to S230. Please refer to the description above for details, which will not be repeated here.

Further, when the target operation includes one or more operations, the one or more operations may be divided into a first target operation and a second target operation. The primary processing circuit may allocate, according to the preset operation allocation rule, the first target operation in the target operation to the primary processing circuit, the second target operation in the target operation to the secondary processing circuit. Correspondingly, the primary processing circuit may store the input data required for the first target operation into the primary memory, and store the input data required for each second target operation to the corresponding secondary memory.

For example, as shown in FIG. 9, if the first memory is capable of containing the target input data in the section of C1-C2 of the pooling operation and the target input data in the section of B1-B2 of the activation operation, then the pooling operation and the activation operation are equivalent to one target operation. At this time, the target input data of the target operation may be data in the section of C1-C2. According to a preset operation rule, the primary processing circuit may take the activation operation as the first target operation, and allocate the activation operation to the primary processing circuit; take the pooling operation as the second target operation, and allocate the pooling operation to the secondary processing circuit. Accordingly, the input data in the section of C1-C2 required for the pooling operation may be loaded into the secondary memory, and the input data in the section of B1-B2 required for the activation operation may be loaded into the primary memory. Since there is a dependency relationship between the pooling operation and the activation operation, the input data in the section of B1-B2 required for the activation operation may be loaded from the secondary memory to the primary memory after the pooling operation is completed.

In an embodiment, when the target input data of the target operation is only a part of all the input data corresponding to the target operation, each target input data of the target operation is only used to complete a part of the operation of the target operation. In order to improve the processing speed of the target operation and make full use of the storage space of the first memory, the count of target input data corresponding to the target operation may be one or more, and each target input data is a part of all input data, that is, each the target input data contains one or more input data blocks of all input data.

In an embodiment, when the target input data of the target operation is only a part of all the input data corresponding to the target operation, each target input data of the target operation is only configured to complete a part of the target operations. In order to improve the processing speed of the target operation and make full use of the storage space of the first memory, the count of the target input data corresponding to the target operation may be one or more, and each target input data is a part of all the input data, that is, each target input data may contain one or more input data blocks of all the input data, and one or more target input data may be loaded to the first memory at the same time. Further, according to the count of the target input data, the target operation may be split into a plurality of sub-target operations, and optionally, each sub-target operation may achieve the same operation.

The primary processing circuit may determine the count of target operation according to the available storage capacity of the first memory and the target storage capacity required for each target operation, so that the target input data of the one or more target operations may be simultaneously loaded to the first memory. The process of determining the count of the target operations is consistent with the steps S500 to S520. Please refer to the description above for details, which will not be repeated here.

It should be understood that although the flowcharts in FIG. 5-FIG. 7 and all the steps in FIG. 10-FIG. 11 are shown in sequence as indicated by arrows, these steps are not necessarily executed in the order indicated by the arrows. Unless explicitly stated in this present disclosure, there is no strict order restriction on the execution of these steps, and they can be executed in any other order. Moreover, at least some of the steps in FIG. 5-FIG. 7 and FIG. 10-FIG. 11 may include multiple sub-steps or multiple stages, which are not necessarily executed at the same time, but may be executed at different times. These sub-steps or stages are not necessarily executed sequentially, but may be executed alternately with other steps or sub-steps of other steps or at least a part of the stages.

It will be understood by those of ordinary skill in the art that all or a part of the various methods of the embodiments described above may be completed by means of a computer program to instruct associated hardware, and the computer program may be stored in a non-volatile computer readable storage medium. The execution of the computer program may include the process described in the above methods of the present disclosure. Any reference to a memory, storage, database, or other medium used in the embodiments provided by the present disclosure may include a non-volatile and/or a volatile memory. The non-volatile memory may include a Read Only Memory (ROM), a Programmable ROM (PROM), an Electrically Programmable ROM (EPROM), an Electrically Erasable Programmable ROM (EEPROM), or a Flash Memory. The volatile memory may include a Random Access Memory (RAM) or an External Cache Memory. By way of illustration rather than limitation, RAM is available in a variety of formats, such as Static RAM (SRAM), Dynamic RAM (DRAM), Synchronous DRAM (SDRAM), Double Data Rate SDRAM (DDRS-DRAM), Enhanced SDRAM (ESDRAM), Synchlink DRAM (SLDRAM), Rambus Direct RAM (RDRAM), Rambus Dynamic RAM (DRDRAM), Rambus Dynamic RAM (RDRAM), and the like.

Figure 12:
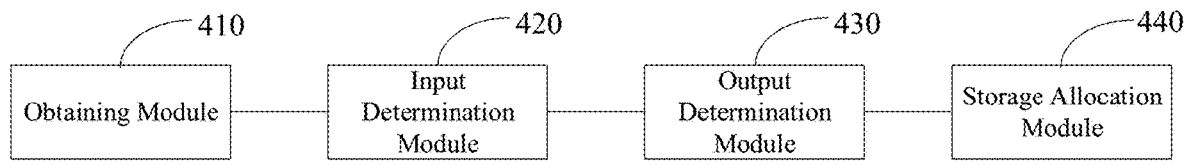
FIG. 12 is a structural block diagram of a data pre-processing device according to an embodiment of the present disclosure.

In an embodiment, as shown in FIG. 12, the embodiment of the present disclosure provides a pre-processing device of data, which may include an obtaining module 410, an input determination module 420, an output determination module 430, and a storage allocation module 440.

The obtaining module 410 may be configured to obtain the available storage capacity of the first memory and the target operation; the input determination module 420 may be configured to determine the target input data corresponding to the target operation according to the target operation and the available storage capacity of the first memory; the output determination module 430 may be configured to determine the target output data of the target operation according to the target operation and the target input data; and the storage allocation module may be configured to store the target output data of the target operation into the primary memory when the target output data of the target operation is the input data of other operation after the target operation, where the first memory is close to the processor.

Figure 13:
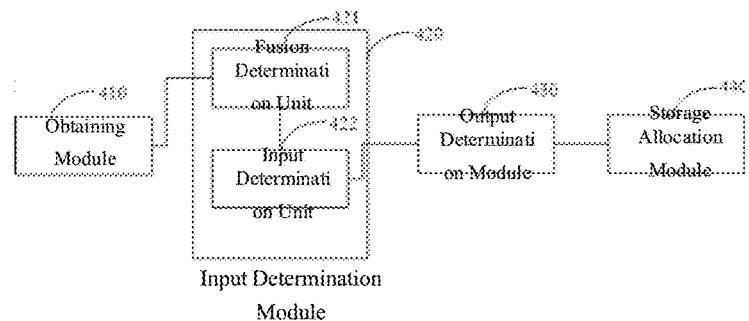
FIG. 13 is a structural block diagram of a data pre-processing device according to an embodiment of the present disclosure.

Optionally, the target operation may include one or more operations, and each of the operation corresponds to sub-target input data. As shown in FIG. 13, the input determination module 420 may further include a fusion determination unit 421 and an input determination unit 422. The fusion determination unit 421 may be configured to determine the count of operations that can be fused and obtain the threshold of the count of fusion according to the available storage capacity of the first memory and the fusion attribute of each operation to be processed. The input determination unit 422 may be configured to take a certain count of combinations of the operations that can be fused as the target operations, where the certain count may be less than or equal to the threshold of the count of fusion; and take the sub-target input data corresponding to a certain count of operations as the target input data corresponding to the target operation.

Optionally, the operation to be processed is a neural network operation containing a plurality of operation layers, where each operation layer may represent an operation; and the fusion determination unit 421 may be further configured to determine the fusion attribute of each operation according to the connection relationship of each operation layer of the neural network operation.

Optionally, the storage allocation module 440 may be further configured to store the intermediate computation result output by the current operation into the first memory, or the intermediate computation result output by the current operation into the first memory and the second memory, if an intermediate computation result output by a current operation in the target operations is required as the input data of other operation in the target operations, or an intermediate computation result output by a current operation is required as the input data of other operation.

Optionally, the target operation may include one or more sub-target operations, and each of the sub-target operation corresponds to one of the target input data; where all the input data corresponding to the target operation may include a plurality of input data blocks, the count of the target input data corresponding to the target operation is one or more, and each of the target input data may include one or more of the input data blocks. The input determination module 420 may be further configured to determine a target storage capacity required for each sub-target operation according to a data volume of the target input data and a data volume of the target output data of each sub-target operation; determine a remaining storage capacity of the first memory according to the available storage capacity of the first memory and the target storage capacity required for the current sub-target operation; determine the count of the sub-target operations according to the remaining storage capacity of the first memory and the target storage capacity required for other sub-target operations other than the current sub-target operation.

Optionally, the storage allocation module 440 may be further configured to store, if there is an intersection of the target input data of one or more of the sub-target operations, an intersection of the target input data of one or more of the sub-target operations into the first memory.

Optionally, the storage allocation module 440 may be further configured to determine a storage address of the target input data in the first memory according to the data volume of the target input data of the target operation; determine a storage address of the target output data in the first memory according to the data volume of the target output data of the target operation; and allocate a part or all of the storage address of the target input data corresponding to the target operation to the target output data of the target operation when all the target operations are completed, if the other operations after the target operation do not need to use the target input data of the target operation.

In another example, as shown in FIG. 12, the obtaining module 410 may be configured to obtain the available storage capacity of the primary memory, the available storage capacity of the secondary memory, and the target operation; the input determination module 420 may be configured to determine the target input data corresponding to the target operation according to the target operation, the available storage capacity of the primary memory, and the available storage capacity of the secondary memory; the output determination module 430 may be configured to determine the target output data corresponding to the target operation according to the target operation and the target input data; and the storage allocation module 440 may be configured to store the target output data into the primary memory when the target output data of the target operation is the input data of other operation after the target operation.

Figure 14:
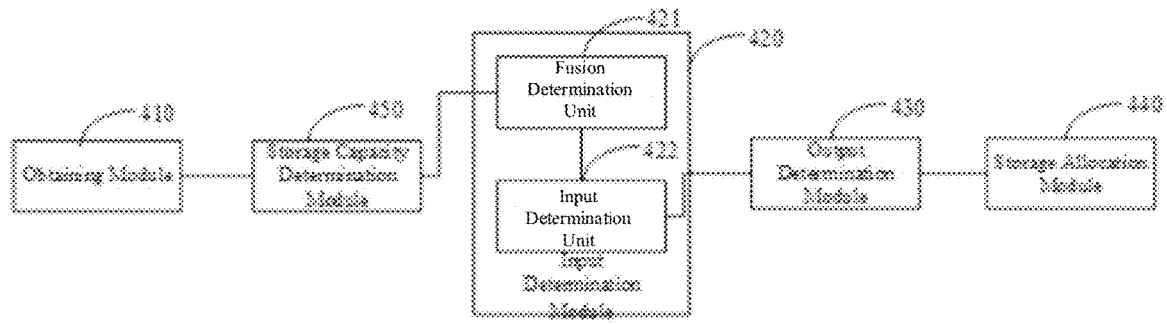
FIG. 14 is a structural block diagram of a data pre-processing device according to another embodiment of the present disclosure.

Optionally, as shown in FIG. 14, the pre-processing device of data may further include a storage capacity determination module 450 configured to compare the available storage capacity of the primary memory with the available storage capacity of each secondary memory, and take the smallest available storage capacity as the available storage capacity of the first memory. The pre-processing device of data may further include the input determination module 420 specifically configured to determine the target input data corresponding to the target operation according to the available storage capacity of the first memory and the target operation.

Optionally, the target operation may include one or more operations, and each operation corresponds to sub-target input data. The output determination module 420 may further include a fusion determination unit 421 and an input determination unit 422. The fusion determination unit 421 may be configured to determine a count of operations that can be fused and obtain a threshold of the count of fusion according to the available storage capacity of the first memory and a fusion attribute of each operation to be processed; and the input determination unit 422 may be configured to take a certain count of combinations of the operations that can be fused as the target operations, where the certain count is less than or equal to the threshold of the count of fusion; and take the sub-target input data corresponding to a certain count of operations that as the target input data corresponding to the target operation.

Optionally, the operation to be processed is a neural network operation containing a plurality of operation layers, where each operation layer represents an operation; and the fusion determination unit 421 may be further configured to determine the fusion attribute of each operation according to a connection relationship of each operation layer of the neural network operation.

Optionally, the target operation may include one or more sub-target operations, and each of the sub-target operation corresponds to one of the target input data, where the input data corresponding to the target operation may include a plurality of input data blocks, the count of the target input data corresponding to the target operation is one or more, and each target input data may include one or more of the input data blocks. The input determination module may be further configured to determine a target storage capacity required for each sub-target operation according to a data volume of the target input data and a data volume of the target output data of each sub-target operation. The input determination module may be further configured to determine a remaining storage capacity of the first memory according to the available storage capacity of the first memory and the target storage capacity required for the current sub-target operation. The input determination module may be further configured to determine the count of the sub-target operations according to the remaining storage capacity of the first memory and the target storage capacity required for other sub-target operations other than the current sub-target operation.

Optionally, the target input data may include the first target input data and the second target input data. The input determination module 420 may be further configured to determine the first target input data corresponding to the primary memory and the second target input data corresponding to each secondary memory according to a preset operation allocation rule. The storage allocation module 440 may be further configured to determine a storage address of the first target input data in the primary memory according to the available storage capacity of the primary memory and the data volume of the first target input data; and determine the storage address of each second target input data in the secondary memory according to the available storage capacity of each secondary memory and the corresponding data volume of the second target input data respectively.

Optionally, the target output data may include the first target output data and the second target output data. The output determination module 430 may be further configured to determine the first target output data and the storage address of the first target output data in the primary memory according to the target operation and the first target input data, determine each second target output data and the storage address of each second target output data in the corresponding secondary memory according to the target operation and each second target input data, and determine the storage address of each second target output data in the primary memory according to each second target output data.

Optionally, the storage allocation module 440 may be further configured to store the second target output data into the secondary memory corresponding to the secondary processing circuit when other target operations performed on the secondary processing circuit need to use the second target output data. Further, the storage allocation module 440 may be configured to store the target output data into the primary memory and the second memory respectively, when the target output data of the target operation is the input data of other operation after the target operation.

It should be clear that the working principle of the device is consistent with the execution process of each step in the above methods. Please refer to the description above for details, which are not described herein again.

The present disclosure may further provide a computer readable storage medium storing a computer program. The steps of any one of the method provided by the present disclosure may be implemented when the computer program is executed by the processor. Specifically, the following steps may be implemented when the computer program is executed by the processor:
- obtaining the available storage capacity of the first memory and the target operation;
- determining the target input data corresponding to the target operation according to the target operation and the available storage capacity of the first memory, where the target input data may be part or all of input data corresponding to the target operation;
- determining, according to the target operation and the target input data, the target output data of the target operation; and
- storing, if the target output data of the target operation is the input data of other operation after the target operation, the target output data of the target operation into the first memory, where the first memory is close to a processor.

Further, the processor may be a primary-secondary structure including the primary processing circuit and the secondary processing circuit. At this time, the following steps may be implemented when the computer program is executed by the processor:
- obtaining the available storage capacity of a primary memory, the available storage capacity of a secondary memory, and the target operation;
- determining the target input data corresponding to the target operation according to the available storage capacity of the primary memory, the available storage capacity of the secondary memory, and the target operation, where the target input data is part or all of the input data corresponding to the target operation;
- determining the target output data corresponding to the target operation according to the target operation and the target input data; and
- storing, if the target output data of the target operation is the input data of other operation after the target operation, the target output data of the target operation into the primary memory.

It should be noted that the process of executing the computer program by the processor is consistent with the execution process of each step of the above methods. Please refer to the description above for details, which are not described herein again.

The technical features in different examples may be freely combined. In order to simplify the description, all possible combinations of the technical features of the embodiments are not described. However, as long as there is no contradiction between the combinations of these technical features, they shall fall within the scope of protection of the disclosure.

The above embodiments only show several implementation methods of this disclosure, which are described in a more specific and detailed way, but cannot be interpreted as a restriction on the scope of the present disclosure. It should be indicated that one of ordinary skill in the art may make some variations and improvements within the idea of the

What is claimed is:

1. A data pre-processing method, comprising:
obtaining an available storage capacity of a first memory and a target operation;
determining, according to the target operation and the available storage capacity of the first memory, target input data corresponding to the target operation;
determining, according to the target operation and the target input data, target output data of the target operation; and
storing, if an intermediate computation result output by a current operation in the target operation is required as the input data of another operation in the target operation, the intermediate computation result of the current operation into the first memory;
wherein the target operation includes one or more operations, each operation represents an operation layer in a neural network, the target operation is obtained by fusing a plurality of operation layers having a data dependence relationship in a depth direction of the neural network; and
wherein a number of operation layers in the plurality of operation layers to be fused in the target operation is determined based on the available storage capacity of the first memory and on a requirement that an intermediate computation result output by any operation in the target operation can be stored in the first memory.

2. The data pre-processing method of claim 1, further comprising:
storing the target output data of the target operation into a second memory;
wherein a storage capacity of the first memory is smaller than a storage capacity of the second memory.

3. The data pre-processing method of claim 1, wherein the input data of the target operation comprises the input data of each operation included in the target operation, each operation corresponds to sub-target input data; and the determining of the target input data corresponding to the target operation according to the available storage capacity of the first memory and the target operation includes:
determining a count of operations that can be fused and obtaining a threshold of a count of fusion according to the available storage capacity of the first memory and a fusion attribute of each operation to be processed;
combining a selected number of the operations that can be fused to form the target operation wherein the selected number is less than or equal to the threshold of the count of fusion; and
setting sub-target input data corresponding to the selected number of operations that can be fused as the target input data corresponding to the target operation.

4. The data pre-processing method of claim 3, further comprising:
storing, if an intermediate computation result output by a current operation is required as the input data of another operation, the intermediate computation result output by the current operation into the first memory, or the intermediate computation result output by the current operation into the first memory and the second memory.

5. The data pre-processing method of claim 1, wherein the input data corresponding to the target operation includes a plurality of input data blocks, each target input data includes one or more of the input data blocks, and a count of the target input data corresponding to the target operation is one or more.

6. The data pre-processing method of claim 5, wherein each operation included in the target operation corresponds to one of the target input data; and the data pre-processing method further includes:
determining, according to a data volume of the target input data and a data volume of the target output data of each operation respectively, a target storage capacity required for each operation;
determining, according to the available storage capacity of the first memory and the target storage capacity required for a current operation, a remaining storage capacity of the first memory; and
determining, according to the remaining storage capacity of the first memory and the target storage capacity required for other operations other than the current operation, a count of the operations in the target operation.

7. The data pre-processing method of claim 6, further comprising:
storing, if there is an intersection between the target input data of one or more of the operations, the intersection between the target input data of one or more of the operations into the first memory.

8. The data pre-processing method of claim 1, further comprising:
storing, if an operation interval between other operation after the target operation and the target operation is within a preset range, the target output data into the first memory.

9. The data pre-processing method of claim 1, further comprising:
determining, according to a data volume of the target input data of the target operation, a storage address of the target input data in the first memory; and
determining, according to a data volume of the target output data of the target operation, a storage address of the target output data in the first memory.

10. The data pre-processing method of claim 9, further comprising:
allocating a part or all of the storage address of the target input data corresponding to the target operation to the target output data of the target operation when the target operation is completed, if other operations after the target operation do not need to use the target input data of the target operation.

11. A data pre-processing device, comprising:
a storage capacity obtaining circuit configured to obtain an available storage capacity of a first memory, and a target operation;
an input determination circuit configured to determine target input data corresponding to the target operation according to the target operation and the available storage capacity of the first memory;
an output determination circuit configured to determine target output data corresponding to the target operation according to the target operation and the target input data; and
a storage allocation module configured to store the intermediate computation result of the current operation into the first memory when an intermediate computation result output by a current operation in the target operation is required as the input data of another operation in the target operation;

wherein the target operation includes one or more operations, each operation represents an operation layer in a neural network, the target operation is obtained by fusing a plurality of operation layers having data dependence relationship in a depth direction of the neural network; and wherein a number of operation layers in the plurality of operation layers to be fused in the target operation is determined based on the available storage capacity of the first memory and a data volume of the target input data and on a requirement that an intermediate computation result output by any operation in one or more operations fused in the target operation can be stored in the first memory.

12. The data pre-processing device of claim 11, wherein the input data of the target operation comprises the input data of each operation included in the target operation, each of the operations corresponds to a sub-target input data; and the output determination circuit further includes:
   a fusion determination unit configured to determine a count of operations that can be fused and obtain a threshold of a count of fusion according to the available storage capacity of the first memory and a fusion attribute of each operation to be processed; and
   an input determination unit configured to combine a selected number of operations that can be fused to form the target operation, wherein the selected number is less than or equal to the threshold of the count of fusion; and set sub-target input data corresponding to the selected number of operations that can be fused as the target input data corresponding to the target operation.

13. The data pre-processing device of claim 12, wherein the storage allocation circuit is further configured to, if an intermediate computation result output by a current operation is required as the input data of another operation, store the intermediate computation result output by the current operation into the first memory, or store the intermediate computation result output by the current operation into the first memory and the second memory.

14. The data pre-processing device of claim 11, wherein each operation included in the target operation corresponds to one of the target input data; wherein all the input data corresponding to the target operation includes a plurality of input data blocks, each of the target input data includes one or more of the input data blocks, and a count of the target input data corresponding to the target operation is one or more; and the input determination circuit is further configured to:
   determine a target storage capacity required for each operation according to a data volume of the target input data and a data volume of the target output data of each operation respectively;
   determine a remaining storage capacity of the first memory according to the available storage capacity of the first memory and the target storage capacity required for a current operation; and
   determine a count of the operation according to the remaining storage capacity of the first memory and the target storage capacity required for other sub-target operations other than the current operation.

15. The data pre-processing device of claim 14, wherein the storage allocation circuit is further configured to, if there is an intersection of the target input data of one or more of the operations, store the intersection between the target input data of one or more of the operations into the first memory.

16. The data pre-processing device of claim 11, wherein the storage allocation circuit is further configured to:
   determine a storage address of the target input data in the first memory according to a data volume of the target input data of the target operation;
   determine a storage address of the target output data in the first memory according to a data volume of the target output data of the target operation; and
   allocate a part or all of the storage address of the target input data corresponding to the target operation to the target output data of the target operation when the target operation is completed, if other operations after the target operation do not need to use the target input data of the target operation.

17. A computer device comprising a first memory, a second memory, and a processor; the first memory and the second memory are capable of reading and writing data; and the first memory or the second memory is configured to store a computer program, wherein the steps of the data pre-processing method of claim 1 are implemented when the processor executes the computer program.

18. A non-transitory computer readable storage medium storing a computer program, wherein the steps of the data pre-processing method of claim 1 are implemented when the computer program is executed by a processor.

* * * * *

UNITED STATES PATENT AND TRADEMARK OFFICE
CERTIFICATE OF CORRECTION

| | | |
|---|---|---|
| PATENT NO. | : 11,966,583 B2 | Page 1 of 1 |
| APPLICATION NO. | : 16/622503 | |
| DATED | : April 23, 2024 | |
| INVENTOR(S) | : Shaoli Liu et al. | |

It is certified that error appears in the above-identified patent and that said Letters Patent is hereby corrected as shown below:

In the Claims

In Column 34, Line 62, in Claim 11, delete "module" and insert -- circuit --.

Signed and Sealed this
First Day of October, 2024

*Katherine Kelly Vidal*

Katherine Kelly Vidal
*Director of the United States Patent and Trademark Office*